(12) United States Patent
Han

(10) Patent No.: US 9,001,067 B2
(45) Date of Patent: Apr. 7, 2015

(54) METHOD OF DRIVING TOUCH PANEL

(71) Applicant: Yong In Han, Seoul (KR)

(72) Inventor: Yong In Han, Seoul (KR)

(73) Assignee: Dongbu HiTek Co., Ltd. (KR)

( * ) Notice: Subject to any disclaimer, the term of this patent is extended or adjusted under 35 U.S.C. 154(b) by 38 days.

(21) Appl. No.: 14/054,678

(22) Filed: Oct. 15, 2013

(65) Prior Publication Data

US 2015/0054754 A1 Feb. 26, 2015

(30) Foreign Application Priority Data

Aug. 23, 2013 (KR) .................. 10-2013-0100225

(51) Int. Cl.
*G06F 3/044* (2006.01)
*G06F 3/041* (2006.01)

(52) U.S. Cl.
CPC .................................. *G06F 3/0418* (2013.01)

(58) Field of Classification Search
CPC ....... G06F 3/044; G06F 3/041; G06F 3/0418; G06F 3/047

USPC .................. 345/173, 174; 178/18.06
See application file for complete search history.

(56) References Cited

U.S. PATENT DOCUMENTS

2011/0080353 A1* 4/2011 Kang et al. ..................... 345/173
2014/0267158 A1* 9/2014 Bertrand et al. .............. 345/174

* cited by examiner

*Primary Examiner* — Jennifer Nguyen
(74) *Attorney, Agent, or Firm* — Andrew D. Fortney; Central California IP Group, P.C.

(57) ABSTRACT

Disclosed herein is a method of driving a touch panel having driving lines, sensing lines, and node capacitors between neighboring driving lines and sensing lines. The method includes pairing two neighboring driving lines, setting the pairs such that each of the pairs is driven using driving signals having an opposite phase, shuffling positions of the pairs so that at least one set of neighboring pairs includes different driving lines, classifying or combining at least two shuffled pairs into one group, generating Hadamard codes based on the pairs in each group, and simultaneously driving the driving lines in each of the generated Hadamard codes.

20 Claims, 18 Drawing Sheets

METHOD OF DRIVING TOUCH PANEL

This application claims the benefit of Korean Patent Application No. 10-2013-0100225, filed on Aug. 23, 2013, which is incorporated herein by reference as if fully set forth herein.

BACKGROUND OF THE INVENTION

1. Field of the Invention

The present invention relates to a method of driving a touch panel.

2. Discussion of the Related Art

In order to measure the magnitude of capacitance of each sensing node of a touch panel, a method of applying a pulse sequence of a specific frequency through driving lines by a driving unit and measuring signals received through sensing lines by a sensing unit is generally used. Here, as the frequency of the pulse sequence, a frequency having the lowest level of noise may be selected to suppress influence of various environmental noise sources (charger noise, fluorescent lamp noise, etc.). Further, the sensing unit may use a proper signal processing technique to extract only a signal component of the corresponding frequency.

In general, in touch detection, it may be judged that touch is generated if a response input to the sensing unit when all sensing nodes are not touched is used as a reference value, and a current input response is changed by more than a designated amount or range as compared to the reference value. For such judgment, absolute response measurement at the respective sensing nodes is required. During a process of directly measuring absolute responses, a dynamic range of signals received by the sensing unit needs to be considered.

In order to increase sensing signal quality, the intensity of signals received by the sensing unit needs to be increased as compared to noise, or a sensing time needs to be extended. The intensity of signals received by the sensing unit may be increased as compared to noise by raising a voltage level of the pulse sequence applied to the driving lines. Further, in order to elongate the sensing time at sensing nodes, a multiplexing technique of simultaneously driving a plurality of driving lines, a frequency division multiplexing technique, or a code division multiplexing technique may be used.

However, an increase in the voltage level of the pulse sequence or use of the multiplexing technique may increase the dynamic range of the signals received by the sensing unit and increase the size and complexity of an analog front-end of the sensing unit. Further, in case of multiplexing, the intensity of the signals of unit sensing nodes during data conversion is reduced, and thus multiplexing may be susceptible to quantization noise or circuit noise.

SUMMARY OF THE INVENTION

Accordingly, the present invention is directed to a method of driving a touch panel.

An object of the present invention is to provide a method of driving a touch panel which may reduce a dynamic range of signals received by sensing lines and improve a signal-to-noise ratio and sensitivity.

Additional advantages, objects, and features of the invention will be set forth in part in the description which follows and in part will become apparent to those skilled in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of driving a touch panel having driving lines, sensing lines, and node capacitors between neighboring driving lines and sensing lines, includes pairing two neighboring driving lines to form a plurality of pairs such that each of the plurality of pairs is driven using driving signals having an opposite phase, shuffling positions of the plurality of pairs so that at least two neighboring pairs include different driving lines, classifying or combining at least two shuffled pairs into a first group (and optionally into a plurality of groups), generating Hadamard codes based on the pairs in each group, including the first group, and simultaneously driving the driving lines in each of the generated Hadamard codes.

In forming the plurality of pairs, two neighboring pairs may include a common driving line.

Generating the Hadamard codes may include Hadamard coding of the pairs in each group based on Equation 1 disclosed herein, to generate primary Hadamard codes.

Generating the Hadamard codes may include shuffling the primary Hadamard codes so that at least one set of neighboring primary Hadamard codes includes different driving lines, forming a plurality of groups by selecting and classifying or combining two primary Hadamard codes including different driving lines into one group, and generating secondary Hadamard codes by Hadamard coding the two primary Hadamard codes in each of the plurality of groups based on Equation 2 disclosed herein.

The number of the simultaneously driven driving lines may be a power of 2.

In another aspect of the present invention, a method of driving a touch panel having first to $i^{th}$ driving lines (i being a natural number $>1$), sensing lines, and node capacitors between neighboring driving lines and sensing lines, in which $2^{k+1}$ driving lines (k being a natural number $\geq 1$) are simultaneously driven, includes pairing neighboring driving lines among the first to $i^{th}$ driving lines to form first to $m^{th}$ sequential pairs, m being a natural number $>1$, setting the first to $m^{th}$ pairs such that each of the first to $m^{th}$ pairs is driven using driving signals having an opposite phase, shuffling positions of the first to $m^{th}$ pairs so that at least one set of neighboring pairs includes different driving lines, selecting and classifying or combining at least two pairs including different driving lines into a first group, generating k-dimensional Hadamard codes by Hadamard coding, based on the at least two pairs in each group, and simultaneously driving the driving lines in each of the k-dimensional Hadamard codes.

In forming the first to $m^{th}$ pairs, two neighboring pairs among the first to $m^{th}$ pairs may include one common driving line.

In shuffling the positions of the first to $m^{th}$ pairs, two pairs including different driving lines may be selected from the first to $m^{th}$ pairs, and the positions of the first to $m^{th}$ pairs may be changed so that the selected pairs neighbor each other.

Generating the k-dimensional Hadamard codes may include generating primary Hadamard codes by Hadamard coding the pairs in each of the first to $m^{th}$ pairs, shuffling the primary Hadamard codes so that at least one set of at least two neighboring primary Hadamard codes includes different driving lines, generating secondary Hadamard codes by Hadamard coding the shuffled primary Hadamard codes, and generating the k-dimensional Hadamard codes by repeating shuffling and Hadamard coding.

Generating the k-dimensional Hadamard codes may be carried out based on Equation 3 disclosed herein.

The method may further include changing the driving lines in at least one of the pairs in at least one of the k-dimensional Hadamard codes to different driving lines.

The method may further include changing the driving lines in at least one of the pairs in at least one of the k-dimensional Hadamard codes to be in common with at least one of the driving lines in the pair in another one of the k-dimensional Hadamard codes.

The driving lines in at least one of the pairs in at least one of the k-dimensional Hadamard codes may be changed within the numbers of the first to $i^{th}$ driving lines.

The driving time of the driving lines in each of the k-dimensional Hadamard codes may be twice the driving time of the driving lines in each of the (k−1)-dimensional Hadamard codes.

The method may further include receiving a superposed signal on each of the sensing lines, and the superposed signal may be a signal resulting from superposition of driving signals received on the sensing line corresponding to the driving lines in each of the simultaneously driven k-dimensional Hadamard codes.

In another aspect of the present invention, a method of driving a touch panel having first to $i^{th}$ driving lines (i being a natural number >1), sensing lines, and node capacitors between neighboring driving lines and sensing lines, in which $2^{k+1}$ driving lines (k being a natural number ≥1) are simultaneously driven, includes pairing neighboring driving lines among the first to $i^{th}$ driving lines, and setting the pairs such that each of the pairs is driven using driving signals having an opposite phase, grouping the pairs and shuffling the pairs so that the pairs in each group include different driving lines, selecting and classifying or combining at least two pairs in each group into a first sub-group, selecting at least two pairs among the pairs in each sub-group, generating k-dimensional Hadamard codes by Hadamard coding the selected pairs, and simultaneously driving the driving lines in each of the k-dimensional Hadamard codes.

In the formation of the plurality of pairs, a number difference between the two driving lines in each of the plurality of pairs may be 1.

In the formation of the plurality of pairs, a number difference between the two driving lines in at least one of the plurality of pairs may be 2 or more.

The generation of the k-dimensional Hadamard codes may be carried out based on Equation 3 disclosed herein.

The method may further include changing the driving lines in at least one of the pairs in at least one of the k-dimensional Hadamard codes to different driving lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
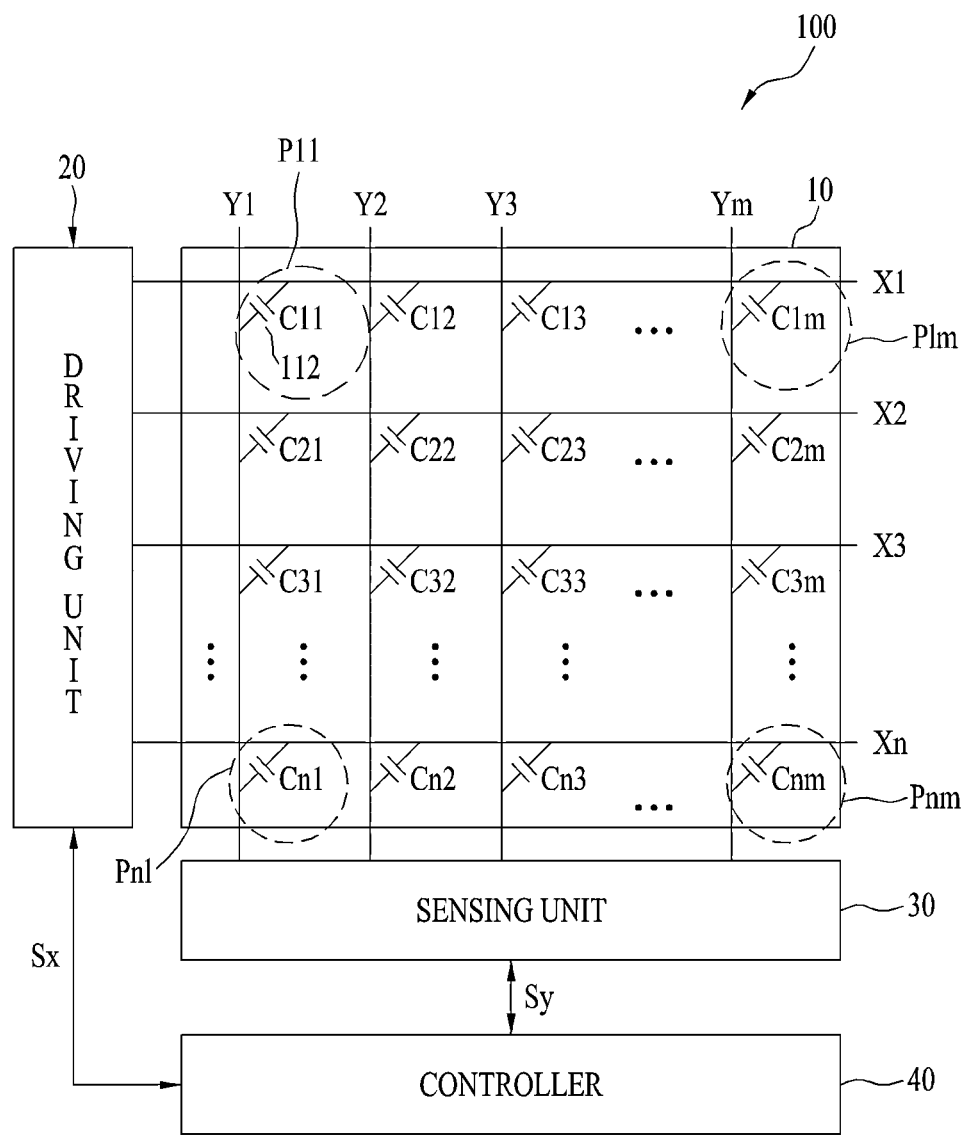
FIG. 1 is an exemplary circuit diagram of a touchscreen device in accordance with one or more embodiments of the present invention.

Hereinafter, embodiments of the present invention will be described with reference to the annexed drawings. It will be understood that when an element is referred to as being 'on' or 'under' another element, it can be directly on/under the element and one or more intervening elements may also be present. When an element is referred to as being 'on' or 'under', 'under the element' as well as 'on the element' can be included based on the element. Further, a criterion for being on or under each element may be judged based on the drawings.

In the drawings, sizes may be exaggerated, omitted, or schematically illustrated for convenience and clarity of description. Further, the sizes of the respective elements do not necessarily represent actual or relative sizes thereof. Further, in the drawings, the same or similar elements are denoted by the same reference numerals even though they are depicted in different drawings. Hereinafter, a method of driving driving lines of a touch panel and a touchscreen device in accordance with one or more embodiments the present invention will be described with reference to the accompanying drawings.

FIG. 1 is a circuit diagram of a touchscreen device 100 in accordance with one or more embodiments of the present invention.

With reference to FIG. 1, the touchscreen device 100 includes a touch panel 10, a driving unit 20, a sensing unit 30, and a controller 40.

The touch panel 10 provides a plurality of sensing nodes P11 to Pnm (n and m being natural numbers >1) substantially exhibiting independent functions and located at different positions of the touch panel 10. The sensing nodes P11 to Pnm may be referred to as coordinates, sensing points, nodes, or a sensing node array.

For example, the touch panel 10 may include a plurality of driving lines X1 to Xn (n being a natural number >1), a plurality of sensing lines Y1 to Ym (m being a natural number >1), and node capacitors C11 to Cnm (n and m being natural numbers >1) between neighboring driving lines and sensing lines.

The driving lines X1 to Xn may be referred to as driving signal lines or driving electrodes. Further, the sensing lines Y1 to Ym may be referred to as sensing signal lines or sensing electrodes.

Although FIG. 1 illustrates the driving lines X1 to Xn and the sensing lines Y1 to Ym as intersecting each other, embodiments of the present invention are not limited thereto and the driving lines X1 to Xn and the sensing lines Y1 to Ym may be configured so as not to intersect each other (e.g., they may be parallel to each other).

Any one sensing node (for example, P11) may be defined by a first node capacitor (for example, C11) between a first driving line (for example, X1) and a first sensing line (for example, Y1).

For example, the driving line Xi (i being a natural number satisfying $0 < i \leq n$) and the sensing line Yj (j being a natural number satisfying $0 < j \leq m$) may be insulated from each other, and the node capacitor Cij may be formed between the driving line Xi (i being as defined above) and the sensing line Yj (j being as defined above).

For example, the touch panel 10 may include an electrode pattern layer (not shown) including the sensing electrodes and the driving electrodes separated from each other, a substrate (not shown) in front of the electrode pattern layer, and an insulating layer (not shown) at the rear of the electrode pattern layer. The layout of the electrode pattern layer may have various shapes according to the design method.

The electrode pattern layer may include at least one light-transmitting conductive material including, for example, indium tin oxide (ITO), tin oxide (TO), indium zinc oxide (IZO), indium tin zinc oxide (ITZO), indium aluminum zinc oxide (IAZO), indium gallium zinc oxide (IGZO), indium gallium tin oxide (IGTO), aluminum zinc oxide (AZO), antimony tin oxide (ATO), gallium zinc oxide (GZO), carbon nanotubes (CNT), a conductive polymer, silver, and/or a copper-based transparent ink.

The electrode pattern layer may be applied to 1 or more layers of glass or plastic, thus forming the sensing node array P11 to Pnm (n and m being natural numbers >1).

The substrate may be a dielectric film or substrate having high light transmittance, and comprise, for example, at least one of glass, polyethylene terephthalate (PET), polyethylene naphtalate (PEN), polyimide (PI), and a (meth)acrylate polymer.

The insulating layer may be a light-transmitting insulating layer comprising PET. In accordance with another embodiment of the present invention, in order to remove electromagnetic interference (EMI) and noise introduced into the electrode pattern layer, a shield layer (not shown) may be located under the insulating layer.

The touch panel 10 may be merged with a layer for the display or have a path for driving or sensing in common with the display layer according to the panel design method. The touch panel, which is not merged with a display, may form a 2D sensing node array through a known method, and these embodiments of the present invention may be applied to a touch sensing system including the 2D sensing node array.

The driving unit 20 may be electrically connected to the plural driving lines X1 to Xn (n being a natural number >1) and provide driving signals to the driving lines X1 to Xn.

For example, the driving unit 20 may simultaneously provide driving signals to 2 or more driving lines among the plural driving lines X1 to Xn (n being a natural number >1).

Here, "simultaneously" may include events which precisely simultaneously occur as well as events that occur substantially simultaneously. For example, events that simultaneously occur may mean events that start and/or end almost simultaneously, and/or that generate partially or substantially completely superposed time periods.

For example, the driving signal may be a periodic voltage, and be simultaneously applied to 2 or more driving lines among the plural driving lines X1 to Xn (n being a natural number >1).

The sensing unit 30 may be electrically connected to the plural sensing lines Y1 to Ym (m being a natural number >1) and sense the capacitance of a node capacitor between a driving line to which the driving signal is applied and a sensing line corresponding to the driving line.

The driving unit 20 may include at least one driving circuit providing the driving signal to the driving lines X1 to Xn, and the sensing unit 30 may include at least one sensing circuit sensing signals received through the sensing lines Y1 to Ym.

Figure 10:
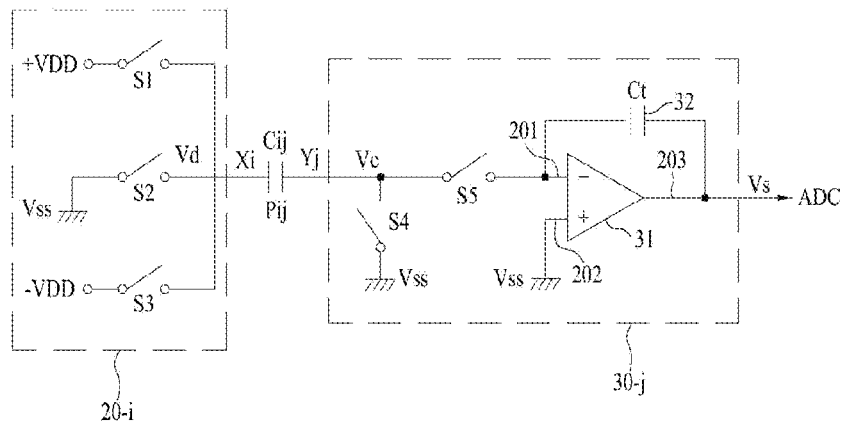
FIG. 10 is a view illustrating one or more embodiments of a driving circuit included in a driving unit and a sensing circuit included in a sensing unit shown in FIG. 1.

FIG. 10 is a view illustrating an exemplary driving circuit 20-$i$ included in the driving unit 20 and an exemplary sensing circuit 30-$j$ included in the sensing unit 30 shown in FIG. 1.

Although FIG. 10 illustrates only the driving circuit 20-$i$ coupled to the $i^{th}$ driving line Xi and the sensing circuit 20-$j$ coupled to the $j^{th}$ sensing line Yj, the driving unit 20 may actually include a plurality of driving circuits coupled to n driving lines X1 to Xn (n being a natural number >1) and a plurality of sensing circuits coupled to m driving lines Y1 to Ym (m being a natural number >1).

With reference to FIG. 10, the driving circuit 20-$i$ may include at least one driving switch (for example, S1, S2, and/or S3) connected between the driving line Xi and a power source (for example, VDD, −VDD, Vss and/or a ground potential).

For example, the driving circuit 20-$i$ may include a first driving switch S1 connected between the driving line Xi and a first power source (for example, a positive power source) VDD, a second driving switch S2 connected between the driving line Xi and a second power source (for example, a ground potential) Vss, and a third driving switch S3 connected between the driving line Xi and a third power source (for example, a negative power source) −VDD.

A pulse-type driving signal Vd may be generated according to on/off operations of the switches S1, S2, and S3. The generated driving signal Vd may be provided to the driving line Xi. Cyclic switching of the switches S1, S2, and S3 (e.g., turning on switch S1 for a first predetermined period of time while switches S2 and S3 are off, turning on switch S2 for a second predetermined period of time while switches S1 and S3 are off, turning on switch S3 for a third predetermined period of time while switches S1 and S2 are off, and turning on switch S2 for a fourth predetermined period of time while switches S1 and S3 are off, wherein at least the first and third predetermined periods of time are equal or substantially equal and the second and fourth predetermined periods of time are equal or substantially equal) can form a periodic or cyclic driving signal.

The sensing circuit 30-$j$ may include an amplifier 31, an integrating capacitor 32, and sensing switches S4 and S5.

The amplifier 31 may be a differential amplifier including a first input terminal (for example, an inverting terminal) 201 connected to the sensing line Yj, a second input terminal (for example, a non-inverting terminal) 202 connected to the second power source Vss, and an output terminal 203 outputting a sensing signal Vs. Although FIG. 10 illustrates an exemplary operational amplifier as the amplifier 31, embodiments of the present invention are not limited thereto.

The integrating capacitor 32 may be electrically connected between the first input terminal 201 and the output terminal 203 of the amplifier 31, and may serve to perform negative feedback from the output of the amplifier 31 to the first input terminal 201.

The first sensing switch S4 may be electrically connected between the sensing line Yj and the second power source Vss. The second sensing switch S5 may be electrically connected between the sensing line Yj and the first input terminal 201 of the amplifier 31.

The sensing circuit 30-$j$ may sense a signal transmitted through the sensing line Yj according to on/off operations of the sensing switches S4 and S5, and output a sensing signal Vs according to sensed results.

If 2 or more driving lines are simultaneously driven, a signal Vc received by the sensing circuit 30-$j$ may be a signal received through the sensing line Yj through superposition of the driving signals of the simultaneously driven driving lines. That is, the driving signals of the simultaneously driven driving lines may be superposed into the signal Vc at the sensing line Yj, and the signal Vc may be received by the sensing unit 30.

The controller 40 controls operation of the driving unit 20 and the sensing unit 30.

For example, the controller 40 may generate a driving control signal Sx controlling the driving switches S1, S2, and S3 of the driving circuit 20-$i$ and a sensing control signal Sy controlling the sensing switches S4 and S5 of the sensing circuit 30-$j$, and may control operation of the driving unit 20 and the sensing unit 30 according to the driving control signal Sx and the sensing control signal Sy.

The controller 40 may control the driving unit 20 to simultaneously drive the plural driving lines based on timing charts in accordance with embodiments of the present invention.

For example, the controller 40 may control a plurality of driving circuits and simultaneously drive the plural driving lines based on timing charts shown in FIGS. 3, 5, 7, 8, and 11 to 15.

For example, the controller 40 may control the driving switches S1, S2, and S3 through the driving control signal Sx and simultaneously drive the plural driving lines based on timing charts shown in FIGS. 3, 5, 7, 8, and 11 to 15.

The controller 40 may sense the signal Vc received through the sensing line Yj, and control the sensing unit 30 so as to output the sensing signal Vs according to sensed results.

For example, the controller 40 may sense the signal Vc received through the sensing line Yj, and control sensing circuits or the sensing switches S4 and S5 so as to output the sensing signal Vs according to sensed results.

For example, the driving unit 20 may simultaneously drive 2 or more driving lines (for example, X1 and X2) by applying a driving signal Vd including a pulse sequence having a specific frequency to the 2 or more driving lines (for example, X1 and X2). A driving method of 2 or more driving lines will be described later.

The sensing unit 30 may sense the superposed signal Vc received by the sensing line Yj through the simultaneously driven 2 or more driving lines, and output a sensing signal Vs according to sensed results.

Figure 2:
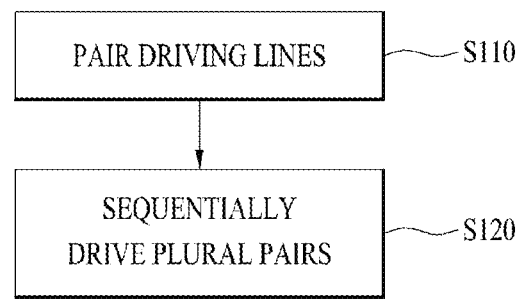
FIG. 2 is a flowchart illustrating an exemplary method of driving driving lines of the touch panel in accordance with embodiment(s) of the present invention.
Figure 3:
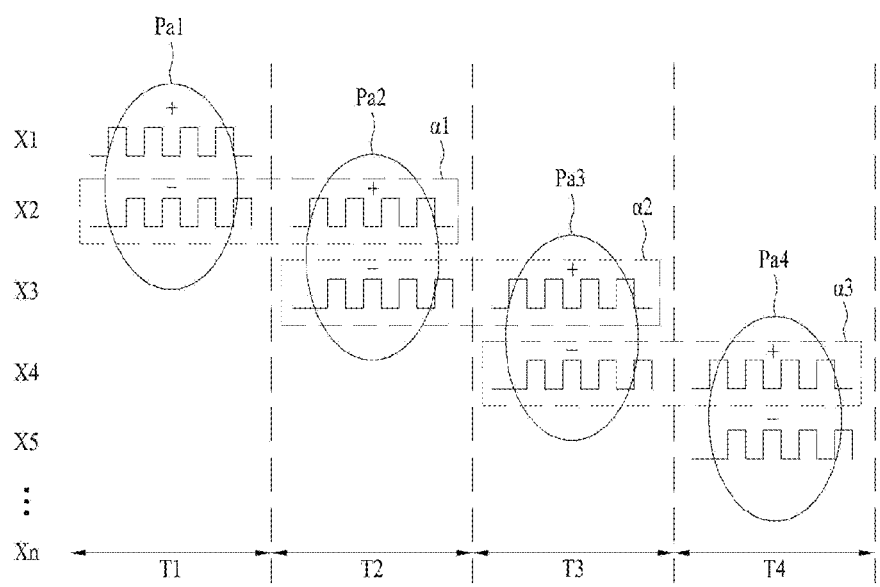
FIG. 3 is a timing chart illustrating simultaneous driving of 2 driving lines according to the exemplary method of FIG. 2.

FIG. 2 is a flowchart illustrating a method of driving the driving lines X1 to Xn (n being a natural number >1) of the touch panel 10 in accordance with one or more embodiments of the present invention, and FIG. 3 is a timing chart illustrating simultaneous driving of 2 driving lines according to the method of FIG. 2.

With reference to FIGS. 2 and 3, the first to $n^{th}$ driving lines X1 to Xn (n being a natural number >1, such as ≥4, ≥8, ≥16, ≥32, etc.) are grouped into a plurality of pairs, for example, first to $k^{th}$ pairs Pa1 to Pak (k being a natural number >1, such as ≥2, ≥4, ≥8, ≥16, etc.). Each of the plurality of pairs Pa1 to Pak (k being a natural number >1) includes 2 driving lines, and driving signals having opposite phases are transmitted to the 2 driving lines (Operation S110).

The plural pairs Pa1 to Pak (k being a natural number >1), which are sequentially arranged and/or in driving sequence, may be formed by selecting two from among the first to $n^{th}$ driving lines X1 to Xn (n being a natural number >1), and this operation may be referred to as "pairing". Here, the first to $n^{th}$ driving lines X1 to Xn (n being a natural number >1) may be redundantly selected.

For example, one pair may be formed by selecting two neighboring driving lines from among the first to $n^{th}$ driving lines X1 to Xn (n being a natural number >1). As shown in the example of FIG. 3, two neighboring pairs (for example, Pa1 and Pa2, Pa2 and Pa3, or Pa3 and Pa4) may have one common or equal driving line (for example, X2, X3, or X4) (shown as $\alpha1$, $\alpha2$, and $\alpha3$).

For example, two neighboring driving lines may be selected as one pair in a direction from the first driving line X1 to the $n^{th}$ driving line Xn, and neighboring pairs (e.g., Pa1 and Pa2) may include one common driving line (e.g., X2). Further, the pairs may be sequentially arranged and/or in pairing order.

The reason why two neighboring driving lines are selected as one pair is that transfer characteristics (transfer functions which will be described later) of the two neighboring driving lines may be similar to each other.

In embodiments of the present invention, by simultaneously driving neighboring driving lines having similar transfer characteristics using driving signals having opposite phases, the dynamic range of the superposed signal Vc (in FIG. 10) received by the sensing unit 30 may be reduced, and thus, the signal to noise ratio of the sensing signal Vs (in FIG. 10) of the sensing unit 30 may be improved. Here, the "superposed signal" Vc refers to a signal generated according to superposed results of the driving signals received through the sensing line connected to the sensing nodes corresponding to the simultaneously driven driving lines.

For example, with reference to FIG. 3, one driving line (for example, X2) included in one pair (for example, Pa2) may be the same as one driving line (for example, X2) included in another neighboring pair (for example, Pa1).

For example, with reference to FIG. 3, each of the plural pairs Pa1 to Pak (k being a natural number satisfying 1<k<n) may include one driving line in common with the neighboring pair.

For example, with reference to FIG. 3, one of 2 driving lines included in one pair (for example, X3 of the two driving lines X3 and X4 in pair Pa3) may be the same as one of 2 driving lines included a neighboring pair (for example, X3 of the two driving lines X2 and X3 in pair Pa2). Further, the other one of the 2 driving lines included in the one pair (for example, X4 of the two driving lines X3 and X4 in pair Pa3) may be the same as one of 2 driving lines included in another neighboring pair (for example, X4 of the two driving lines X4 and X5 in pair Pa4).

With reference to FIG. 3, each of the first driving line X1 and the $n^{th}$ driving line Xn belongs to one pair, but each of the remaining driving lines X2 to X(n−1) may belong to two neighboring pairs.

The reason why two neighboring pairs have one common driving line is to extract a change of relative values of the driving lines, i.e., a profile.

If two neighboring pairs do not have a common driving line, a difference value of driving signals between the driving lines in each pair may be measured, but a difference value of driving signals between the driving lines in the neighboring pairs may not be easily measured.

As described above, 2 driving lines in each of the plural pairs Pa1 to Pak (k being a natural number satisfying 1<k≤n) may be simultaneously driven using driving signals of opposite phases, for example during one section or period.

Since 2 driving lines are grouped into one pair, and driving signals having opposite phases are simultaneously provided to the 2 driving lines (e.g., for one section or period), each pair may be defined as an anti-phase pair.

The plural pairs Pa1 to Pak (k being a natural number satisfying 1<k≤n) are sequentially driven during plural sections or periods T1 to Tk (k being a natural number >1), and the driving signal(s) simultaneously driving the 2 driving lines in each pair may have opposite phases during each section or period (Operation S120).

For example, each section or period may be a unit time during which the driving signals are transmitted to and/or drive the driving lines.

For example, the driving lines X1 and X2 belonging to the first pair Pa1 may be simultaneously driven during a first section or period T1, the driving lines X2 and X3 in the second pair Pa2 may be simultaneously driven during a second section or period T2, the driving lines X3 and X4 in the third pair Pa3 may be simultaneously driven during a third section or period T3, and the driving lines X4 and X5 in the fourth pair Pa4 may be simultaneously driven during a fourth section or period T4.

A single driving signal may be provided to the common driving line in two neighboring pairs (for example, X3 in Pa2 and Pa3) during two neighboring sections or periods (for example, T1 and T2). Examples of the single driving signal provided to the common driving line in two neighboring pairs are shown in FIG. 3 as α1, α2, and α3.

The exemplary sensing signal Vs of the sensing unit shown in FIG. 10 is input to an analog-to-digital converter (ADC) to perform analog-to-digital conversion (e.g., convert the analog sensing signal Vs to a multi-bit digital signal). The magnitude of the sensing signal Vs may be restricted to within an input range of the ADC. Therefore, when the dynamic range of the signal Vc received by the sensing unit 30 is increased, the capacitance Ct of the integrating capacitor 32 should be increased in proportion to the increase in the dynamic range. This may cause an increase in the chip size of the sensing unit 30 (or of a chip including the sensing unit 30).

In these embodiments, by simultaneously driving neighboring driving lines having similar transfer characteristics using driving signals of opposite phases, the dynamic range of the signal Vc received by the sensing unit 30 may be reduced.

As the dynamic range of the signal Vc received by the sensing unit 30 is reduced, a ratio of the sensing signal Vs of the exemplary sensing unit 30 to circuit noise and quantization noise generated downstream from the amplifier 31 (i.e., the signal to noise ratio) may be improved, and an increase in the chip size of the sensing unit 30 may be prevented.

Further, due to improvement of the signal to noise ratio and prevention of an increase in the chip size of the sensing unit 30, in various embodiments, the number of driving lines which are simultaneously driven may be increased, and thus, the signal to noise ratio regarding noise introduced from the outside upstream from the amplifier 31 may be improved.

FIGS. 4A to 4G are views illustrating various exemplary pairing methods and shuffling methods in accordance with different embodiments of the present invention.

Figure 4A:
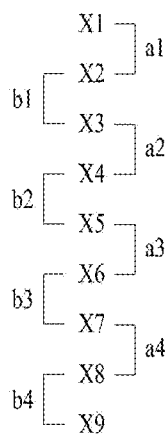
FIGS. 4A to 4G are views illustrating pairing methods in accordance with different embodiments of the present invention.

With reference to FIG. 4A, two neighboring driving lines may be grouped into one pair, and a number difference between 2 driving lines in each of a plurality of pairs a1 to ar and b1 to bq (for example, r=4 and q=4) may be 1, as shown in the example of FIG. 3. Further, neighboring pairs may include one driving line in common.

With reference to FIGS. 4B to 4G, through pairing (Operation S110 in FIG. 2), the first to $n^{th}$ driving lines X1 to Xn (n being a natural number >1) may be grouped into a plurality of pairs a1 to ar and b1 to bq (r and q being natural numbers >1).

A number difference between 2 driving lines in at least one of the plurality of pairs a1 to ar and b1 to bq (r and q being natural numbers >1) may be 2 or more.

Figure 4B:
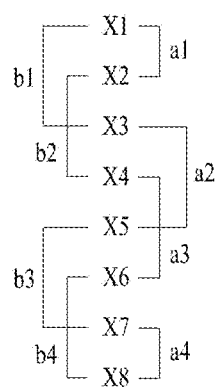
Figure 4C:
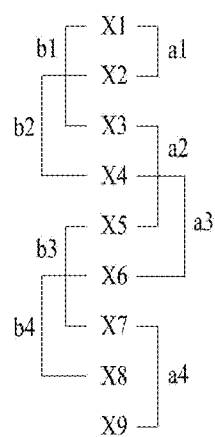
Figure 4D:
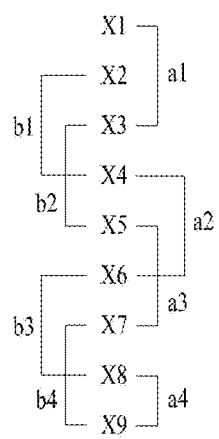
Figure 4E:
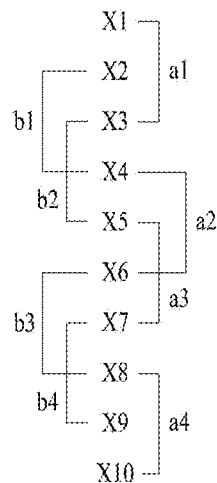

For example, in case of FIG. 4E, a number difference between 2 driving lines in each of the pairs a1 to ar and b1 to bq (r and q being natural numbers >1) may be 2.

In cases of FIGS. 4B to 4D, 4F, and 4G, a number difference between 2 driving lines in at least one pair (e.g., at least 2 pairs, or alternatively, all but 2 pairs) may be 2.

At least one pair including neighboring driving lines may be provided. For example, a number difference between 2 driving lines in any one pair or two pairs may be 1.

Figure 4F:
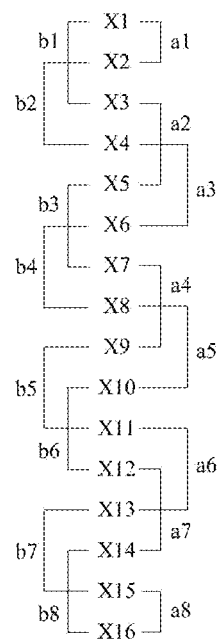
Figure 4G:
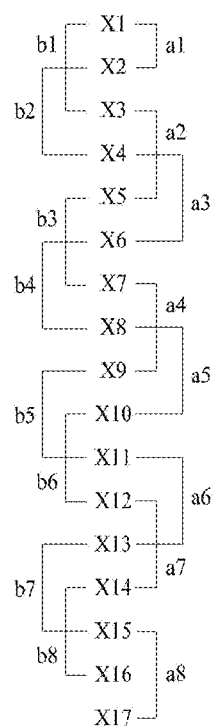

The pairs a1 shown in FIGS. 4B and 4C may include the driving lines X1 and X2, the pair a4 shown in FIG. 4B may include the driving lines X7 and X8, the pair a4 shown in FIG. 4D may include the driving lines X8 and X9, the pairs a1 shown in FIGS. 4F and 4G may include the driving lines X1 and X2, and the pair a8 shown in FIG. 4F may include the driving lines X15 and X16.

Figure 5:
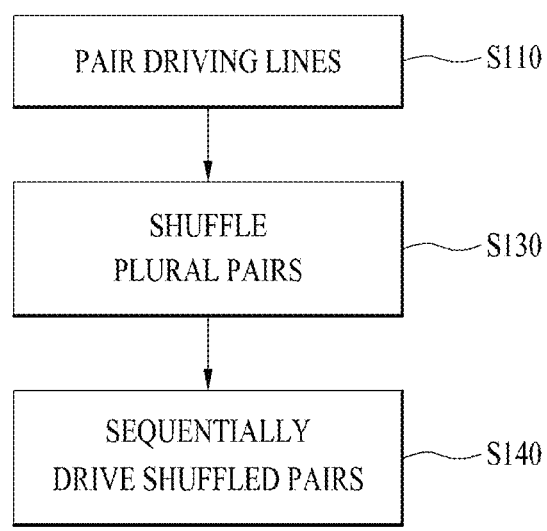
FIG. 5 is a view illustrating an exemplary method of driving driving lines of a touch panel in accordance with one or more other embodiments of the present invention.

Further, the plural pairs a1 to ar and b1 to bq (r and q being natural numbers >1) may be classified into a first group and a second group so that neighboring pairs may have different driving lines through shuffling (Operation S130 in FIG. 5).

For example, in FIGS. 4A to 4G, the pairs a1 to ar (r being a natural number >1) in the first group may include different driving lines, and the pairs b1 to bq (q being a natural number >1) in the second group may include different driving lines.

Two pairs may be selected from among the pairs a1 to ar (r being a natural number >1) in the first group, and form a plurality of first sub-groups. Each of the first sub-groups may include two pairs selected from the first group.

Hadamard codes may be generated by performing Hadamard coding of two pairs included in each of the first sub-groups according to Equation 1, which will be described below, with reference to FIG. 6.

Further, two pairs may be selected from among the pairs b1 to bq (q being a natural number >1) in the second group, and form a plurality of second sub-groups. Each of the second sub-groups may include two pairs selected from the second group.

k-dimensional Hadamard codes may be generated by performing Hadamard coding of two pairs in each of the second sub-groups according to Equations 1 to 3, which will be described below, and driving lines in each of the k-dimensional Hadamard codes may be simultaneously driven.

Figure 11:
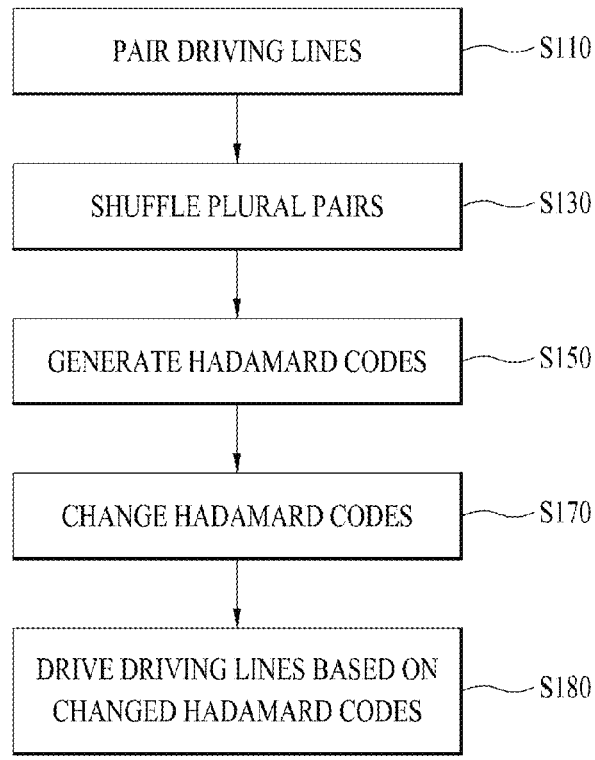
FIG. 11 is a view illustrating an exemplary method of driving driving lines of a touch panel in accordance with embodiment(s) of the present invention.

Further, as shown in the example of FIG. 11, which will be described later, each of the driving lines in at least one of the pairs in at least one of the k-dimensional Hadamard codes may be changed to a different driving line.

Figure 6:
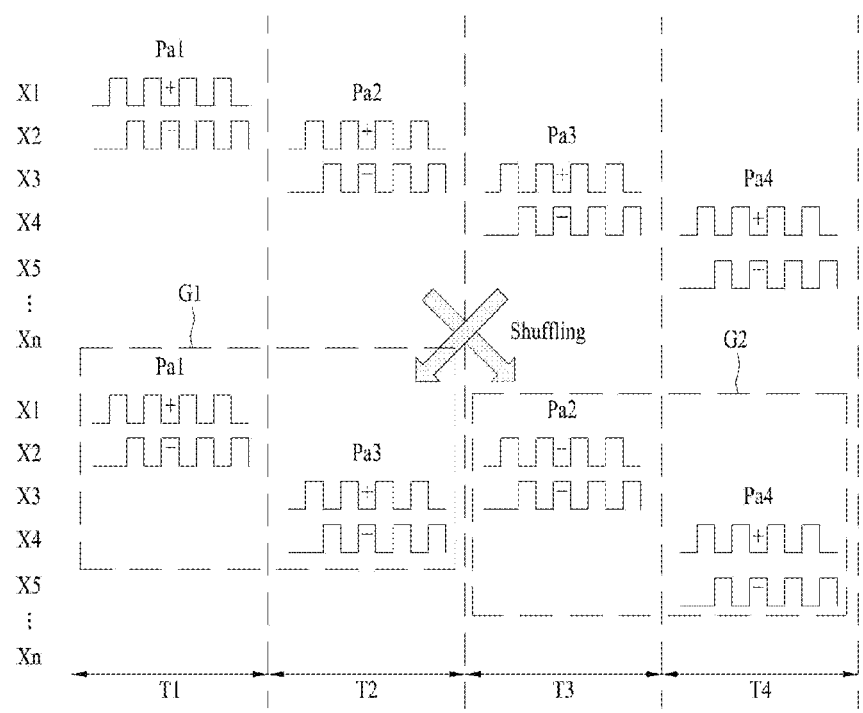
FIG. 6 is a timing chart illustrating simultaneous driving of 2 driving lines according to the exemplary method of FIG. 5.

FIG. 5 is a view illustrating a method of driving driving lines X1 to Xn (n being a natural number >1) of a touch panel in accordance with one or more further embodiments of the present invention, and FIG. 6 is a timing chart illustrating simultaneous driving of 2 driving lines according to an example of the method of FIG. 5.

With reference to FIGS. 5 and 6, a plurality of pairs, for example, first to $k^{th}$ pairs Pa1 to Pak (1<k<n), may be generated by performing pairing (Operation S110), generally as described with reference to FIGS. 2, 3, and 4A to 4G.

Thereafter, in order to change the driving sequence of the first to $k^{th}$ pairs Pa1 to Pak (1<k<n), the positions of the first to $k^{th}$ pairs Pa1 to Pak (1<k<n) are changed (Operation S130). This operation may be referred to as "shuffling," meaning shuffling of two or more of the pairs Pa1 to Pak (1<k<n) with each other.

The positions of the pairs Pa1 to Pak (1<k<n) may be changed so that at least one set of two neighboring pairs includes different driving lines or does not include a common driving line.

2 driving lines in each of two neighboring pairs may not have a driving line in common with each other after selecting two pairs from among the pairs Pa1 to Pak (1<k<n), and interchanging the positions of the selected pairs.

For example, two neighboring pairs may be selected from among the pairs Pa1 to Pak (1<k<n), and the positions of the two selected neighboring pairs may be interchanged.

As shown in the example of FIG. 6, when the positions of the neighboring second pair Pa2 and third pair Pa3 are interchanged (by shuffling), the neighboring first pair Pa1 and third pair Pa3 may include different driving lines (or no driving lines in common), and the neighboring second pair Pa2 and fourth pair Pa4 may include different driving lines (or no driving lines in common).

That is, through shuffling (Operation S130), at least one set of two neighboring pairs (e.g., Pa1 and Pa3 and/or Pa2 and Pa4) including different driving lines (e.g., no driving lines in common) may be present (two sets in FIG. 6).

Thereafter, the driving lines in the shuffled pairs (for example, the pairs Pa1, Pa3, Pa2, and Pa4) are sequentially driven during a plurality of successive sections or time periods T1 to Tk (for example, k=4) (Operation S140). Hereinafter, the plural pairs for which shuffling has been completed (for example, pairs Pa1, Pa3, Pa2, and Pa4) may be considered as shuffled pairs.

That is, the shuffled pairs may be sequentially driven during respective or successive sections or periods.

For example, the first pair Pa1 may be driven during the first section or period T1, the third pair Pa3 may be driven during the second section or period T2, the second pair Pa2 may be driven during the third section or period T3, and the fourth pair Pa4 may be driven during the fourth section or period T4.

In the embodiment(s) shown in FIGS. 5 and 6, neighboring driving lines having similar transfer characteristics may be simultaneously driven using driving signals of opposite phases, thus reducing the dynamic range of the superposed signal Vc received through the sensing line Yj and improving a ratio of the sensing signal Vs of the sensing unit 30 to noise, i.e., a signal to noise ratio.

Figure 7:
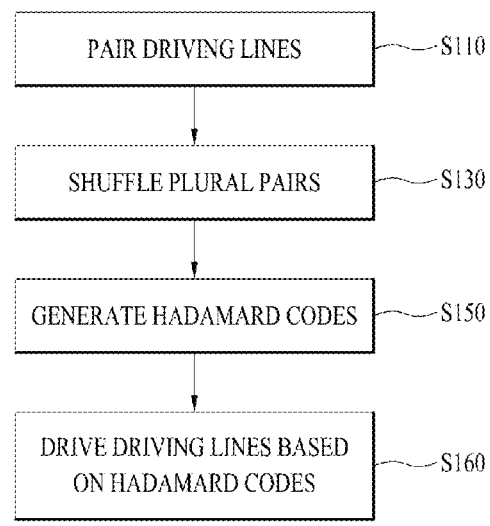
FIG. 7 is a view illustrating a method of driving driving lines of a touch panel in accordance with one or more other embodiments of the present invention.
Figure 8:
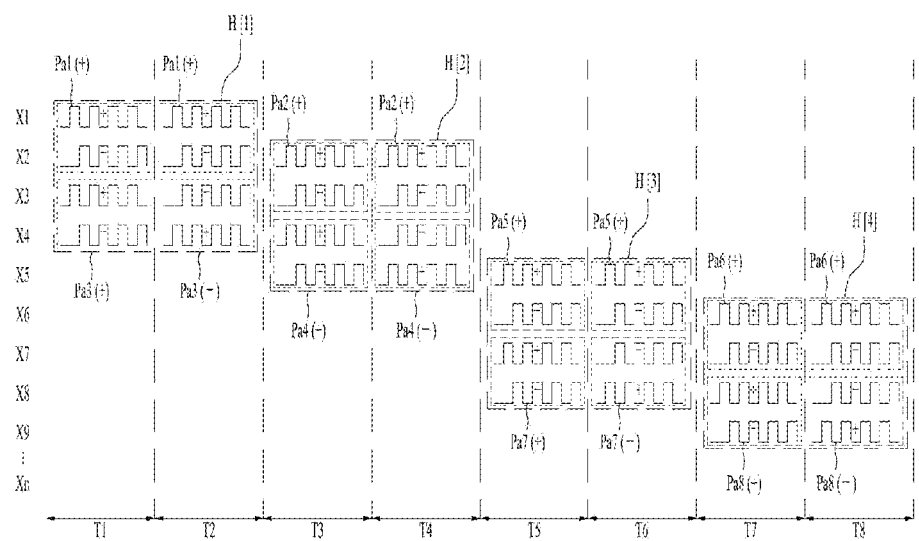
FIG. 8 is a timing chart illustrating simultaneous driving of 4 driving lines according to the method of FIG. 7.

FIG. 7 is a view illustrating an exemplary method of driving lines X1 to Xn (n being a natural number >1) of a touch panel in accordance with another embodiment of the present invention, and FIG. 8 is a timing chart illustrating simultaneous driving of 4 driving lines according to the method of FIG. 7.

In these embodiment(s), in order to simultaneously drive 4 driving lines, pairing (Operation S110) and shuffling (Operation S130), generally as described above with reference to FIGS. 4A to 5, are first performed. The reason for this is so that the driving lines in two neighboring pairs do not have any driving lines in common with each other to facilitate simultaneously driving 4 driving lines in a relatively simple manner. If the two neighboring pairs have a driving line in common, then at most 3 driving lines can be simultaneously driven using the two neighboring pairs.

Thereafter, with reference to FIGS. 7 and 8, the shuffled pairs (for example, pairs Pa1, Pa3, Pa2, and Pa4) may be classified into a plurality of groups by classifying or combining two shuffled pairs having different driving lines (or no common driving lines) among the shuffled pairs (for example, the pairs Pa1 and Pa3 and the pairs Pa2 and Pa4) into one group. Hadamard codes are generated based on (or from) two pairs in each of the plural groups (Operation S150). For example, a Hadamard code in the form of a 2×2 matrix of each of the groups G1 and G2 may be generated.

For example, as shown in the example of FIG. 6, two neighboring shuffled pairs having different driving lines (or no common driving lines, for example, the pairs Pa1 and Pa3 and the pairs Pa2 and Pa4) may be classified into each group, for example, the group G1 and the group G2. The reason for this is to simultaneously drive the driving lines in the shuffled pairs in each of the groups.

By performing Hadamard coding of the shuffled pairs in each of the groups (for example, the pairs Pa1 and Pa3 or the pairs Pa2 and Pa4) according to Equation 1, Hadamard codes (for example, H[1] to H[4]) corresponding to the respective groups may be generated.

$$H[x] = \begin{bmatrix} Pa1(+) & Pa1(+) \\ Pa3(+) & Pa3(-) \end{bmatrix} \qquad [1]$$

Here, x may mean a Hadamard code of a group selected so as to have different driving lines.

(+) may mean that driving signals may have the same phase as those of driving signals which are originally set.

For example, Pa1(+) may mean that the 2 driving lines X1 and X2 in the shuffled pair Pa1 are driven using driving signals having the same phase as the originally set driving signals.

(−) may mean that driving signals may have an opposite phase to those of driving signals which are originally set.

For example, Pa3(−) may mean that the 2 driving lines X3 and X4 in the shuffled pair Pa3 are driven using driving signals of an opposite phase to the originally set driving signals.

Hereinafter, based on the original phase of a driving signal, (+) may be defined as in-phase and (−) may be defined as out-of-phase or anti-phase.

Columns of the Hadamard code (for example, H[1]) may correspond to the driving lines (for example, X1 to X4) in the shuffled pairs (for example, Pa1 and Pa3) which are simultaneously driven, and rows of the Hadamard code (for example, H[1]) may correspond to the sections or periods T1 and T2 in which the shuffled pairs in each of the groups are transmitted.

For example, the Hadamard code (for example, H[1]) corresponding to (or based on) the two shuffled pairs (for example, Pa1 and Pa3) in one group (for example, G1) may be generated by Equation 1. Further, the Hadamard code (for example, H[2]) corresponding to (or based on) the two shuffled pairs (for example, Pa2 and Pa4) in another group (for example, G2) may also be generated by Equation 1.

By Equation 1, the Hadamard codes (for example, H[1], H[2], H[3], and H[4]), which are sequentially arranged, may be generated as shown in the example of FIG. 8. Here, the arrangement sequence of the Hadamard codes may indicate the driving sequence.

Thereafter, the driving lines are simultaneously driven based on the Hadamard codes (Operation S160). The driving lines in the Hadamard code may be simultaneously driven during the same number of sections or time periods as the number of the pairs forming the row of the Hadamard code.

For example, 4 driving lines (for example, X1 to X4) may be simultaneously driven during two sections or periods (for example, T1 and T2) based on the generated Hadamard code (for example, H[1]). Further, 4 driving lines (for example, X2 to X5) may be simultaneously driven in two sections or periods (for example, T3 and T4) based on the generated Hadamard code (for example, H[2]).

FIG. 3 is an exemplary timing chart showing each pair independently transmitted during each section or period, and FIG. 8 is an exemplary timing chart showing each pair transmitted based on the Hadamard codes.

Through comparison of FIGS. 3 and 8, the embodiment(s) of FIG. 8 may simultaneously drive driving lines (for example, X1 and X2) in one pair (for example, Pa1) for a longer time than the embodiment(s) of FIG. 3.

For example, the time to simultaneously drive driving lines (for example, X1 and X2) in one pair (for example, Pa1) in the embodiment(s) of FIG. 8 may be twice that in the embodiment(s) of FIG. 3.

For example, it may be understood that the pair Pa1 is transmitted during one section or period T1 in the embodiment(s) of FIG. 3, and the pair Pa1 is transmitted during two sections or time periods T1 and T2 in the embodiment(s) of FIG. 8.

As compared to the embodiment(s) of FIG. 3, the embodiment(s) of FIG. 8 may increase the number of driving lines which are simultaneously transmitted and the sensing time of one pair (for example, Pa1), and thus improve a signal to noise ratio (SNR) and improve sensitivity.

Figure 9:
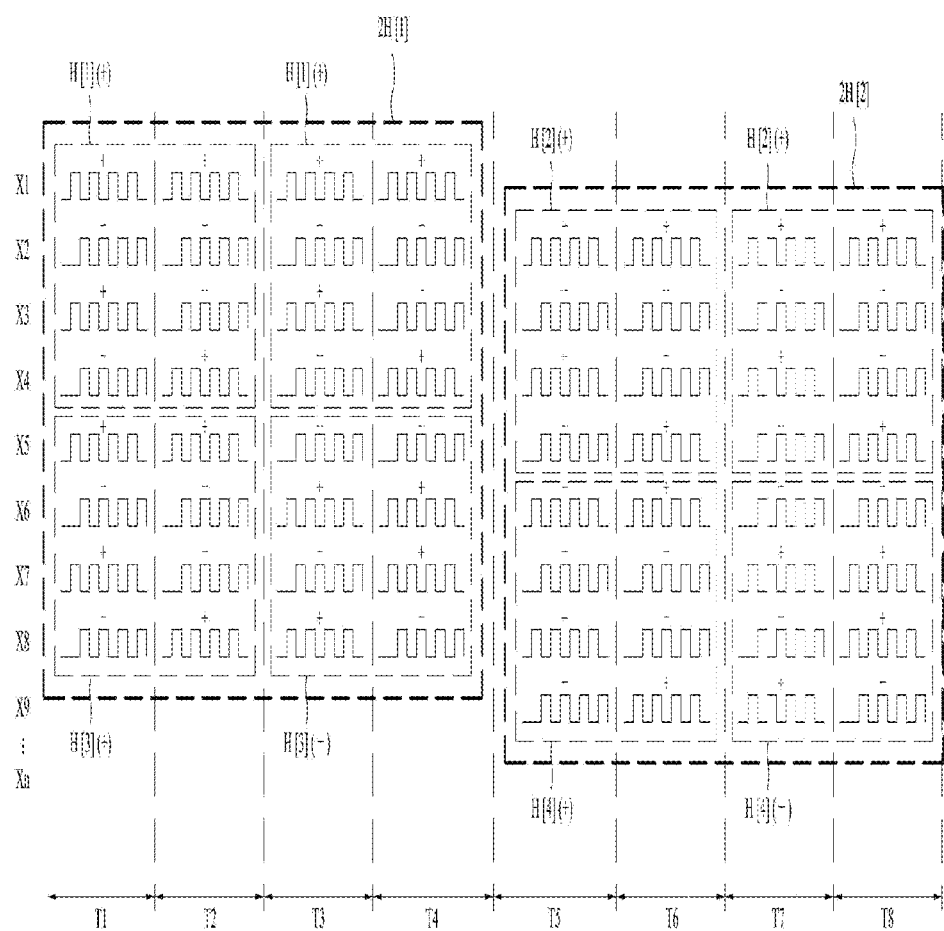
FIG. 9 is a timing chart illustrating simultaneous driving of 8 driving lines in accordance with embodiment(s) of the present invention.

FIG. 9 is an exemplary timing chart illustrating simultaneous driving of 8 driving lines in accordance with one or more embodiments of the invention.

With reference to FIG. 9, Hadamard codes which are sequentially arranged (hereinafter, referred to as "primary Hadamard codes"), such as is shown in the example of FIG. 8, are generated by performing pairing (Operation S110), shuffling (Operation S130), and generation of Hadamard codes (Operation S150), generally as described above with reference to FIGS. 7 and 8.

First, shuffling (Operation S130) of the sequentially arranged primary Hadamard codes (for example, H[1] to H[4]) is performed.

The positions of the plural primary Hadamard codes (for example, H[1] to H[4]) may be changed so that at least one set of two neighboring Hadamard codes includes different driving lines or does not include a common driving line.

For example, when the positions of the neighboring primary Hadamard codes (for example, H[2] and H[3]) are interchanged (shuffling), the driving lines in the two shuffled neighboring primary Hadamard codes (for example, H[1] and H[3], or H[2] and H[4]) may be different and not common to the shuffled neighboring primary Hadamard codes in a group.

The shuffled primary Hadamard codes (for example, H[1], H[3], H[2], and H[4]) are classified into a plurality of groups by selecting two shuffled primary Hadamard codes having different driving lines (or no common driving lines) (for example, H[1] and H[3], and H[2] and H[4]) from among the shuffled primary Hadamard codes (for example, H[1], H[3], H[2], and H[4]) and classifying or combining the selected two shuffled primary Hadamard codes (for example, H[1] and H[3], and H[2] and H[4]) into groups.

For example, the primary Hadamard codes H[1] and H[3] may be classified into one group, and the primary Hadamard codes H[2] and H[4] may be classified into another group.

Thereafter, Hadamard coding of the primary Hadamard codes (for example, H[1] and H[3], and H[2] and H[4]) in the respective groups is performed according to Equation 2, and secondary Hadamard codes (for example, 2H[1] and 2H[2]) are generated according to results of the coding. The reason for this is to simultaneously drive the driving lines in the Hadamard code included in each of the groups.

The secondary Hadamard codes (for example, 2H[1] and 2H[2]) may be generated using Equation 2:

$$2H[y] = \begin{bmatrix} H[1](+) & H[1](+) \\ H[3](+) & H[3](-) \end{bmatrix} \quad \text{[Equation 2]}$$

In Equation 2 above, y of 2H[y] may represent a group to which Hadamard codes having different (e.g., no common) driving lines belong. H[1] and H[3] may represent Hadamard codes in the group y.

(+) may mean that the driving lines in the Hadamard codes (for example, H[1] and H[3]) are driven using driving signals having the same phase as those of driving signals which are originally set.

For example, H[1](+) may mean that the driving lines X1 to X4 in the shuffled primary Hadamard code (for example, H[1]) are driven using driving signals having the same phase as the originally set driving signals.

(−) may mean that the driving lines in the Hadamard codes are driven using driving signals of an opposite phase to that of driving signals which are originally set.

For example, H[3](−) may mean that the driving lines X5 to X8 in the shuffled primary Hadamard code (for example, H[3]) are driven using driving signals having an opposite phase to the originally set driving signals.

The driving lines in the secondary Hadamard code may be simultaneously driven during the same number of sections or time periods as the number of the pairs forming a row of the Hadamard code. For example, based on the secondary Hadamard code (for example, 2H[1]), 8 driving lines (for example, X1 to X8) may be simultaneously driven during four 4 sections or time periods T1 to T4.

Tertiary Hadamard codes to simultaneously drive $2^4$ driving lines may be generated using the above-described shuffling (Operation S130) and Hadamard coding (Operation S150) operations using Equation 2.

As described above, in order to simultaneously drive $2^2$ driving lines, shuffling and Hadamard coding may be performed once, and in order to simultaneously drive $2^3$ driving lines, shuffling and Hadamard coding may be performed twice.

Assume that, in a touch panel including first to $i^{th}$ driving lines (i being a natural number >1), sensing lines, and node capacitors between neighboring driving lines and sensing lines, $2^{(k+1)}$ driving lines are simultaneously driven.

k-dimensional Hadamard codes may be generated by performing shuffling and Hadamard coding k times.

First, first to $m^{th}$ pairs (m being a natural number >1), which can be sequentially arranged in driving sequence, may be formed by selecting two neighboring driving lines each from among the first to $i^{th}$ driving lines X1 to Xi.

Each of the first to $m^{th}$ pairs may be driven using driving signals of opposite phases during one section or time period. Further, among the first to $m^{th}$ pairs, two neighboring pairs may include one equal or common driving line.

Thereafter, the positions of the first to $m^{th}$ pairs may be shuffled so that at least one set of two neighboring pairs includes different (or no common) driving lines.

For example, two pairs having different driving lines may be selected from among the first to $m^{th}$ pairs, and the positions of the first to $m^{th}$ pairs may be changed so that the selected pairs neighbor each other.

Otherwise, for example, two neighboring pairs may be selected from among the first to $m^{th}$ pairs, and the positions of the selected neighboring pairs may be interchanged.

Thereafter, the shuffled pairs may be classified into a plurality of groups by classifying or combining two pairs including (completely) different driving lines from among the shuffled pairs into one group, and k-dimensional Hadamard codes may be generated by performing Hadamard coding based on pairs in each of the groups.

For example, the k-dimensional Hadamard codes may be generated as follows.

Primary Hadamard codes may be generated by performing Hadamard coding of two pairs in each of the groups.

Thereafter, the primary Hadamard codes may be shuffled so that at least one set of two neighboring primary Hadamard codes includes different (e.g., no common) driving lines (First Operation).

Thereafter, secondary Hadamard codes may be generated by performing Hadamard coding of the shuffled primary Hadamard codes (Second Operation).

Thereafter, k-dimensional Hadamard codes may be generated by repeating the first and second operations.

Otherwise, the k-dimensional Hadamard codes may be generated by Equation 3 below. Here, k may be a natural number of ≥1.

$$(k)H[y] = \begin{bmatrix} (k-1)H[1](+) & (k-1)H[1](+) \\ (k-1)H[3](+) & (k-1)H[3](-) \end{bmatrix}$$ [Equation 3]

In Equation 3 above, y of (k)H[y] may represent a group to which (k−1)-dimensional Hadamard codes having (completely) different driving lines belong. (k−1)H[1] and (k−1)H[3] may represent (k−1)-Hadamard codes in the group y.

Here, if k=1, [0]H[1] and [0]H[3] may mean 2 pairs (for example, Pa1 and Pa3) having different driving lines after shuffling (Operation S130) has been completed. For example, [0]H[1](+) may represent Pa1(+) in Equation 1, [0]H[3](+) may represent Pa3(+) in Equation 1, and [0]H[3](−) may represent Pa3(−) in Equation 1.

(+) may mean that the driving lines in the (k−1)-dimensional Hadamard codes (for example, (k−1)H[1] and (k−1)H[3]) are driven using driving signals having the same phase as the driving signals which are originally set.

For example, (k−1)H[1](+) may mean that the driving lines in the shuffled (k−1)-dimensional Hadamard code (for example, (k−1)H[1]) are driven using driving signals having the same phase as the originally set driving signals.

(−) may mean that the driving lines in the (k−1)-dimensional Hadamard codes (for example, (k−1)H[3]) are driven using driving signals having an opposite phase to the driving signals which are originally set.

For example, (k−1)H[3](−) may mean that the driving lines in the shuffled (k−1)-dimensional Hadamard code (for example, (k−1)H[3]) are driven using driving signals having an opposite phase to the originally set driving signals.

The driving lines included in at least one of the pairs in at least one of the k-dimensional Hadamard codes may be changed to different driving lines.

The driving lines in at least one of the pairs in at least one of the k-dimensional Hadamard codes may be changed so as to be in common with (or to be equal to) the driving lines in the pair in another one of the k-dimensional Hadamard codes.

The driving lines in at least one of the pairs in at least one of the k-dimensional Hadamard codes may be changed within the numbers of the first to $n^{th}$ driving lines.

The driving time of the driving lines in each of the k-dimensional Hadamard codes may be twice the driving time of the driving lines in each of the (k−1)-dimensional Hadamard codes.

The sensing unit 30 may receive superposed signals through the respective sensing lines, and each superposed signal may be a signal generated from the results of superposition of driving signals received on the sensing line connected to the sensing nodes corresponding to the driving lines respectively in the simultaneously driven k-dimensional Hadamard codes.

The method of driving the touch panel in accordance with such embodiments may reduce the dynamic range of the superposed signal Vc received through the sensing line Yj, improve a ratio of the sensing signal Vs of the sensing unit 30 to noise, i.e., a signal to noise ratio, and/or increase the sensing time of one pair (for example, Pa1) to improve sensitivity.

When 2 or more driving lines are simultaneously driven in the method of driving the touch panel in accordance with such embodiments, the sensing unit 30 may restore the original driving signals from the signal Vc received on the sensing line Yj by performing the signal generation method in an inverse sequence.

For example, the original driving signals may be restored using Hadamard decoding. Hadamard decoding may be the inverse of the process of Hadamard coding.

For example, in FIG. 8, a signal Vc=C1 received by the sensing unit 30 during the first section or period T1 may be equal to Pa1+Pa3, and a signal Vc=C2 received by the sensing unit 30 during the second section or period T2 may be equal to Pa1−Pa3. Then, 2×Pa1 may be extracted by adding C2 to C1, and 2×Pa3 may be extracted by subtracting C2 from C1.

For example, in FIG. 9, a signal Vc=D1 received by the sensing unit 30 during the first and second sections or time periods T1 and T2 may be H[1]+H[3], and a signal Vc=D2 received by the sensing unit 30 during the third and fourth sections or time periods T3 and T4 may be H[1]−H[3].

Then, 2×H[1] may be extracted by adding D2 to D1, and 2×H[2] may be extracted by subtracting D2 from D1. Further, as described above with respect to H[1] and H[3], 2×Pa1 and 2×Pa3 may be extracted.

In such embodiments, a difference of the touch panel 10 in the vertical direction may be directly measured. That is, in such embodiments, a difference of the superposed signal Vc received on the sensing line Yj of the touch panel 10 may be directly measured.

Further, such embodiments may be merged with a conventional method in which the absolute value of the capacitance of the sensing nodes in the horizontal direction of the touch panel 10 or a relative profile are measured.

If driving of a single selected driving line is carried out, the absolute value of the capacitance of the sensing node(s) in the horizontal direction connected to the selected driving line may be acquired. Then, absolute values of the capacitances of all the sensing nodes of the touch panel 10 may be estimated using the absolute value as a reference value. In such a manner, the absolute value of the sensing nodes in the horizontal direction corresponding to the selected driving line or a relative (AC) profile in the horizontal direction may be acquired.

In such embodiments, since a difference of capacitances between the sensing nodes in the vertical direction of the touch panel 10 is measured, a relative profile in the vertical direction of each sensing line of the touch panel 10 may be acquired by integrating signals received on the sensing nodes connected to the sensing lines.

If the absolute value of the capacitance of the sensing nodes P11 to P1*m* in the horizontal direction connected to one selected driving line (for example, X1) may be acquired, the absolute values of the capacitances of the sensing nodes (for example, P21 to Pn1) connected to each sensing line (for example, Y1) connected to the selected driving line (for example, X1) may be estimated.

Then, a capacitance value of the overall frame, i.e., the overall sensing nodes, of the touch panel 10 may be set by performing offset adjustment of each sensing line. The absolute value of the overall frame of the touch panel 10 may be proportional to a change in the mutual capacitance caused by touch.

The dynamic range of the sensing signal Vs is varied according to touch strength. In order to improve sensitivity according to touch strength, the dynamic range of the sensing unit 30 may be adjusted based on touch strength.

If a plurality of driving lines is simultaneously driven, i.e., multiple driving is carried out, driving signals provided by the simultaneously driven driving lines may be superposed and received by one sensing line connected to sensing nodes corresponding to the simultaneously driven driving lines.

According to the principle(s) of superposition, if driving signals applied to the driving lines have the same phase (e.g., of waveforms having the same amplitude or received at the same node), a signal received on the sensing line may be amplified due to constructive interference, and if the driving signals have opposite phases, the signal received on the sensing line may be attenuated due to destructive interference.

In such embodiments, the plural driving lines are simultaneously driven in an anti-phase pair so that driving signals received on the sensing line may destructively interfere with each other. Therefore, only light or relatively small signal variations remaining after destructive interference are received on the sensing line in a non-touched state of the touch panel 10. Thus, the dynamic range of the signal Vc received by the sensing unit 30 may be reduced.

When the touch panel 10 is touched, the dynamic range of the signal Vc received by the sensing unit 30 may be increased in proportion to touch strength within a region of the touch panel 10 corresponding to the simultaneously driven driving lines. As the dynamic range of the signal Vc received by the sensing unit 30 increases, the dynamic range of the sensing signal Vs may exceed an input range of the ADC and thus result in loss of touch information.

That is, the signal Vc, the dynamic range of which may increase according to touch strength, received by the sensing unit 30 may exceed the input range of the ADC. As a result, an output signal of the ADC may be saturated, and touch information may be lost.

In some embodiments, the dynamic range of the input Vc of the sensing circuit 30-*j* of the sensing unit 30 may be adjusted so that the output signal Vs is within the input range of the ADC and/or is in proportion to the touch strength of the touch panel 10, thus improving the signal to noise ratio without risking loss of any touch information.

In these embodiments, the driving lines are driven based on anti-phase pairs. As a result, the dynamic range of the superposed signal input to one sensing line may be reduced, and the signal to noise ratio may be improved.

In terms of characteristics of the touch panel 10, it may be necessary to drive driving lines having different transfer characteristics using driving signals in anti-phase pairs. Here, the transfer characteristics refer to characteristics caused by a transfer function of a path including the driving lines, the node capacitors, and the sensing lines.

As a method of adjusting driving delay, the dynamic range of a superposed signal input to one sensing line may be reduced.

If a driving signal is applied to one driving line, the applied driving signal may be transmitted to the coupled sensing line by the node capacitor and be input to the sensing unit through the sensing line.

If the level of the superposed signal Vc input to the sensing line is high during some sections or time periods (for example, a pulse transition section), these sections or time periods (for example, the transition section) may be removed and the removed signal may be input to the sensing unit 30.

By removing some sections or time periods in which the level of the superposed signal Vc is high (for example, if the driving signal is a pulse signal, then the section or time period may be a pulse transition section) through masking, the dynamic range of the superposed signal Vc may be reduced. Here, the transition section may be a section or period during which the pulse signal transitions from a high level to a low level or a section or period during which the pulse signal transitions from a low level to a high level.

For example, if two signals of opposite phases having transfer characteristics which are similar to each other, but not equal, are superposed, there is a possibility that a difference may be high only during a transition section and be very low during remaining sections or periods.

In various embodiments, some sections or time periods during which the level of the superposed signal is high, for example, a pulse transition section, are excluded, and only the remaining sections or time periods of the superposed signal are used. Thus, restriction of the dynamic range of the superposed signal Vc by the sections or time periods during which the level of the superposed signal is high may be prevented.

The above-described embodiment(s) may be applied to the case(s) in which the number of simultaneously driven driving lines is a power of 2.

FIG. 11 is a view illustrating an exemplary method of driving driving lines of a touch panel 10 in accordance with one or more other embodiments of the present invention.

With reference to FIG. 11, first, pairing (Operation S110), shuffling (Operation S130), and generating Hadamard codes (Operation S150), as described above with regard to FIG. 7, are performed.

Thereafter, driving lines including at least one pair included in at least one of the generated Hadamard codes are changed. This will be referred to as a "change of Hadamard codes" or "changing Hadamard codes", because at least one driving line in the Hadamard code(s) is/are changed (Operation S170).

Figure 12:
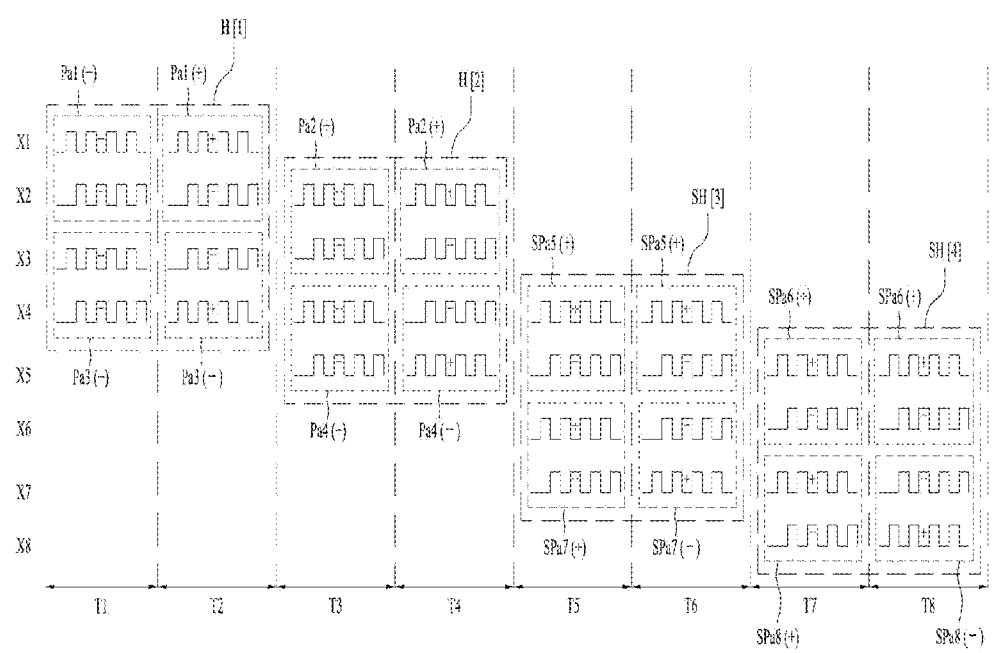
FIG. 12 is a timing chart illustrating an exemplary change of Hadamard codes according to the method of FIG. 11.

FIG. 12 is a timing chart illustrating an exemplary change of Hadamard codes according to the method of FIG. 11.

With reference to FIG. 12, the number of driving lines which are simultaneously driven may be 4.

If 4 driving lines are simultaneously driven, when pairing (Operation S110), shuffling (Operation S130), and generating Hadamard codes (Operation S150) described in FIG. 7 are performed, Hadamard codes H[1], H[2], H[3], and H[4] shown in FIG. 8 may be generated.

The Hadamard codes H[1], H[2], H[3], and H[4] shown in FIG. 8 are changed to Hadamard codes H[1], H[2], SH[3], and SH[4] shown in FIG. 12. For example, among the Hadamard codes H[1], H[2], H[3], and H[4] shown in FIG. 8, the Hadamard codes H[3] and H[4] are changed to the Hadamard codes SH[3] and SH[4].

For example, driving lines X5, X6, X7, and X8 included in pairs Pa5(+), Pa7(+), Pa5(+), and Pa1(−) in the Hadamard code H[3], and driving lines X6, X7, X8, and X9 included in pairs Pa6(+), Pa6(+), Pa8(+), and Pa8(−) in the Hadamard code H[4] may be changed.

For example, the driving lines X5, X6, X7, and X8 included in the pairs Pa5(+), Pa7(+), Pa5(+), and Pa1(−) in the Hadamard code H[3] may be changed to the driving lines X4, X5, X6, and X7, which are decreased in number by 1.

The driving lines X6, X7, X8, and X9 included in the pairs Pa6(+), Pa6(+), Pa8(+), and Pa8(−) in the Hadamard code H[4] may be changed to the driving lines X5, X6, X7, and X8 which are decreased in number by 1.

Although the embodiment(s) shown in FIG. 8 illustrate that a total of 9 driving lines X1 to X9 are driven by simultaneously driving 4 driving lines, the embodiment(s) shown in FIG. 12 illustrate that a total of 8 driving lines X1 to X8 can be driven by simultaneously driving 4 driving lines by additionally changing the Hadamard codes.

In these embodiments, by changing Hadamard codes (Operation S170) in such a manner, the total number of driving lines to be driven may be adjusted in consideration of the number of driving lines which are simultaneously driven.

Figure 13:
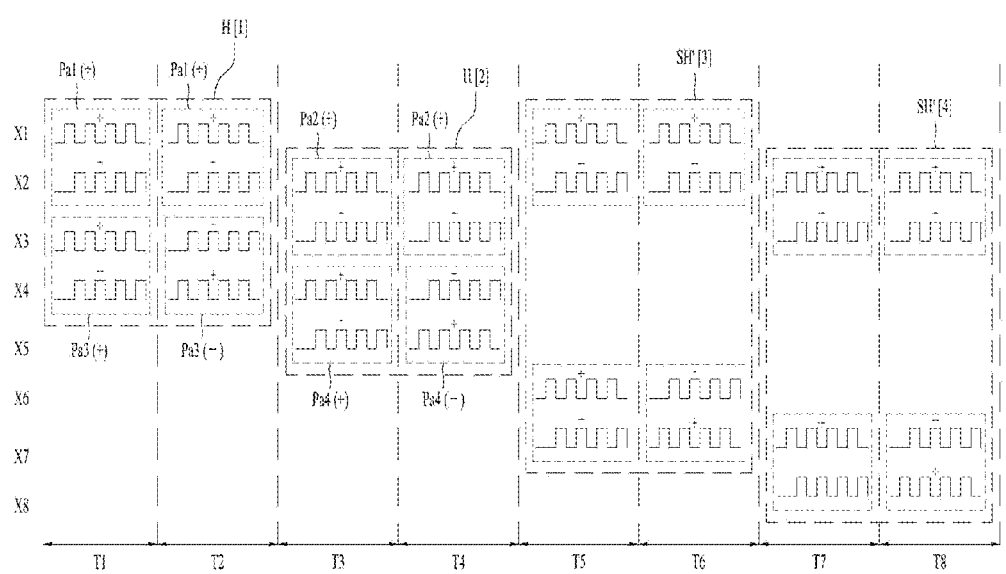
FIG. 13 is a timing chart illustrating an exemplary change of Hadamard codes according to the method of FIG. 11.

FIG. 13 is a timing chart illustrating another embodiment in which Hadamard codes are changed according to the method of FIG. 11. The embodiment shown in FIG. 13 may be a modification of the embodiment(s) shown in FIG. 12.

With reference to FIG. 13, the Hadamard codes H[1], H[2], SH[3], and SH[4] shown in FIG. 12 may be changed to Hadamard codes H[1], H[2], SH'[3], and SH'[4] shown in FIG. 13.

For example, driving lines included in at least one pair of at least one of the Hadamard codes H[1], H[2], SH[3], and SH[4] shown in FIG. 12 may be changed.

For example, the driving lines X4 and X5 in at least one (for example, SPa5(+) in the section or period T5, and SPa5(+) in the section or period T6) of the pairs of the Hadamard code SH[3] may be changed to the driving lines X1 and X2, which are decreased in number by 3.

Further, for example, the driving lines X5 and X6 in at least one (for example, SPa6(+) in the section or period T6, and SPa6(+) in the section or period T8) of the pairs of the Hadamard code SH[4] may be changed to the driving lines X2 and X3, which are decreased in number by 3.

Driving signals may be respectively provided from the controller 40 in FIG. 1 to the driving lines X1 to Xn shown in FIG. 1 through the driving unit 20. Separation distances between the controller 40 and the driving lines X1 to Xn may vary, and loads (for example, resistances) of the driving lines X1 to Xn may vary according to the separation distances.

For example, the driving line X1 may have a longer separation distance from the controller 40 and a greater load than the driving line Xn. Therefore, on the assumption that a driving signal having the same level is provided, the driving line X1 may have a lower signal-to-noise ratio of the sensing signal Vs than the driving line Xn.

In such embodiments, the number of superposition of driving signals provided to driving lines having a relatively large load, or a time to provide the driving signals to the driving lines, may be increased through changing the Hadamard codes. Thereby, differences in signal to noise ratios generated due to relative differences of loads may be reduced.

In FIG. 12, a driving signal may be provided to the first driving line X1 during two sections or time periods T1 and T2, and a driving signal may be provided to the second driving line X2 during four sections or periods T1 to T4.

On the other hand, in FIG. 13, by changing the Hadamard codes, a driving signal may be provided to the first driving line X1 during four sections or periods T1, T2, T5, and T6, and a driving signal may be provided to the second driving line X2 during eight sections or periods T1 to T8.

Therefore, as compared to the embodiment(s) shown in FIG. 12, in the embodiment(s) shown in FIG. 13, the driving time of the first and second driving lines X1 and X2 may be increased by two times. Thereby, the signal to noise ratio of the first and second driving lines X1 and X2 may be improved.

Further, through comparison of the embodiment(s) shown in FIG. 8 and the embodiment(s) shown in FIG. 12, it may be understood that the driving time of the fourth driving line X4 in the embodiment(s) shown in FIG. 12 is increased, and the signal to noise ratio of the fourth driving line X4 in the embodiment(s) shown in FIG. 12 may be improved.

Figure 14:
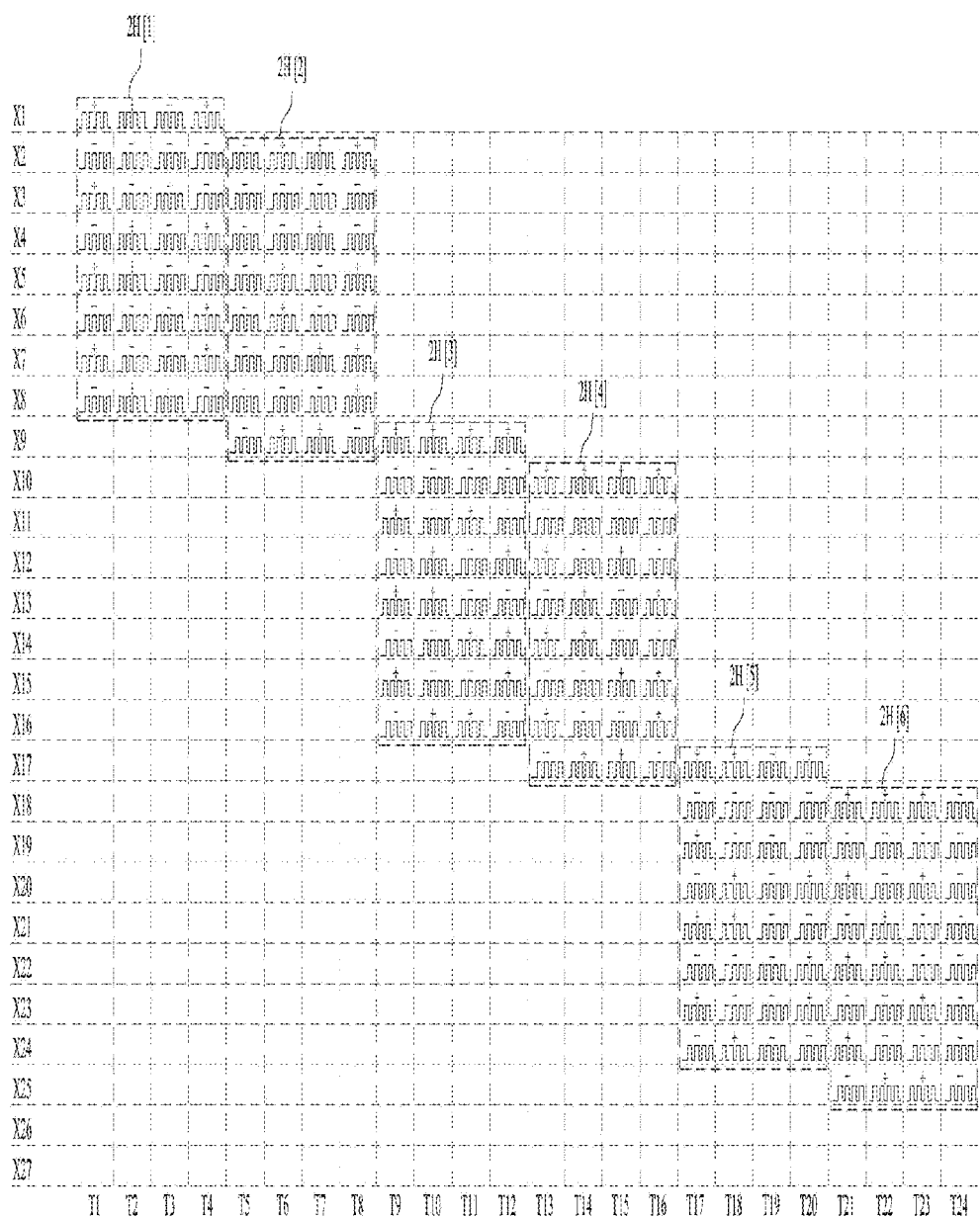
FIG. 14 is a timing chart illustrating simultaneous driving of 8 driving lines according to the method of FIG. 7.
Figure 15:
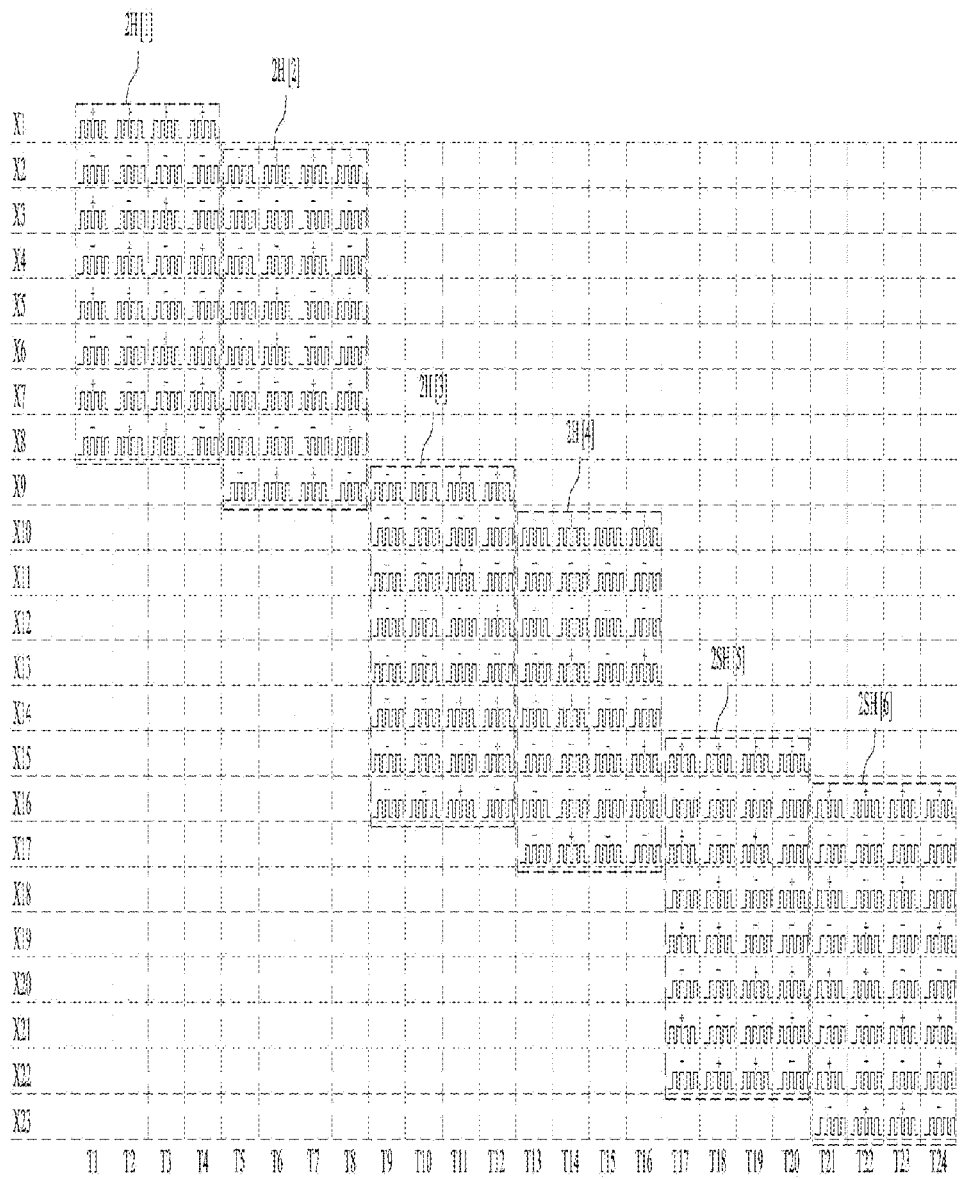
FIG. 15 is a timing chart illustrating simultaneous driving of 8 driving lines according to the method of FIG. 11.

FIG. 14 is a timing chart illustrating simultaneous driving of 8 driving lines according to the method of FIG. 7, and FIG. 15 is a timing chart illustrating simultaneous driving of 8 driving lines according to the method of FIG. 11.

FIG. 14 is a timing chart illustrating driving a total of 25 driving lines X1 to X25 by simultaneously driving 8 driving lines according to the method of FIG. 7.

With reference to FIG. 15, by changing Hadamard codes (Operation S160), Hadamard codes 2H[1], 2H[2], 2H[3], 2H[4], 2H[5], and 2H[6] shown in FIG. 14 may be changed to Hadamard codes 2H[1], 2H[2], 2H[3], 2H[4], 2SH[5], and 2SH[6] shown in FIG. 15.

For example, driving lines in at least one of the pairs in at least one of the Hadamard codes 2H[1], 2H[2], 2H[3], 2H[4], 2H[5], and 2H[6] shown in FIG. 14 may be changed to different driving lines.

For example, the driving lines X17 to X24 included in the pairs the Hadamard code 2H[5] may be changed to the driving lines X15 to X22, which are decreased in number by 2, and the Hadamard code 2SH[5] may include the changed driving lines X15 to X22.

For example, the driving lines X18 to X25 included in all the pairs of the Hadamard code 2H[6] may be changed to the driving lines X16 to X23, which are decreased in number by 2, and the Hadamard code 2SH[6] may include the changed driving lines X16 to X23.

In the embodiment(s) shown in FIG. 14, a total of driving lines are driven by simultaneously driving 8 driving lines. On the other hand, in the embodiment(s) shown in FIG. 15, by changing the Hadamard codes (Operation S170), a total of 23 driving lines may be driven by simultaneously driving 8 driving lines.

Figure 16:
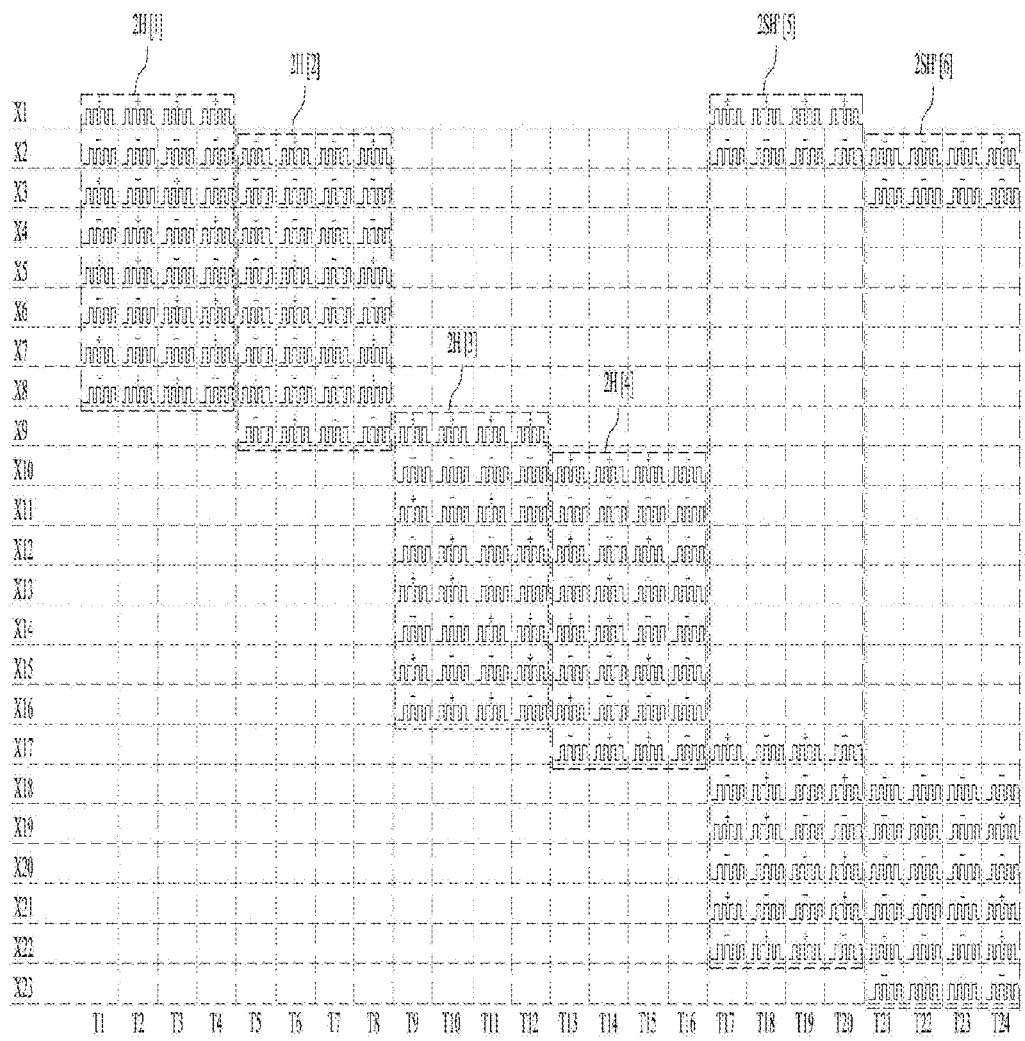
FIG. 16 is a timing chart illustrating simultaneous driving of 8 driving lines according to the method of FIG. 11.

FIG. 16 is a timing chart illustrating another embodiment in which 8 driving lines are simultaneously driven according to the method of FIG. 11. The embodiment(s) shown in FIG. 16 may be a modified embodiment of the embodiment(s) shown in FIG. 15.

By changing the Hadamard codes 2H[1], 2H[2], 2H[3], 2H[4], 2SH[5], and 2SH[6] shown in FIG. 15 (Operation S170), Hadamard codes 2H[1], 2H[2], 2H[3], 2H[4], 2SH'[5], and 2SH'[6] shown in FIG. 16 may be generated.

For example, driving lines in at least one of the pairs of the Hadamard codes 2SH[5] and 2SH[6] shown in FIG. 15 may be changed.

For example, the driving lines X15 and X16 in at least one pair of the Hadamard code 2SH[5] may be changed to the driving lines X1 and X2, which are decreased in number by 14.

For example, the driving lines X16 and X17 in at least one pair of the Hadamard code 2SH[6] may be changed to the driving lines X2 and X3, which are decreased in number by 14.

In such embodiments, by changing the Hadamard codes (Operation S170), the driving time of driving signals applied to the driving lines having a relatively large load (for example, X1 and X2) may be increased. As a result, a difference in the signal to noise ratios resulting from a relative difference in the loads applied to the driving lines may be reduced.

Figure 17:
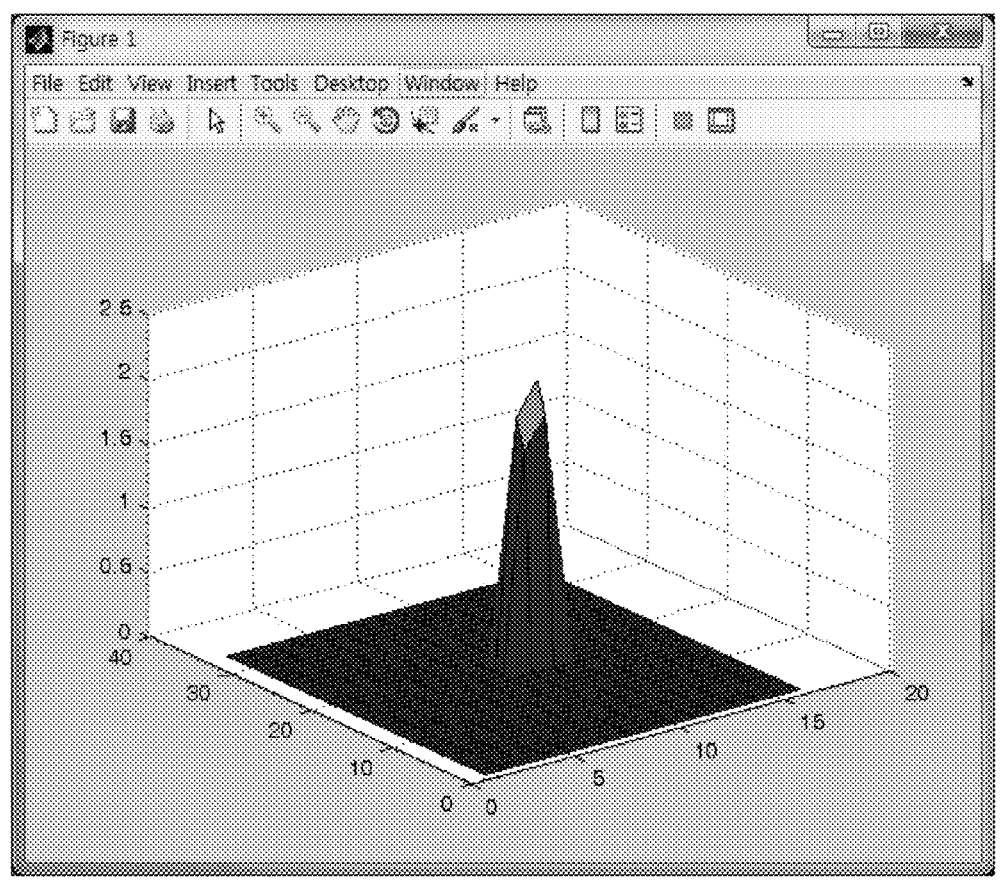
FIG. 17 is a graph illustrating touch signals if a portion of a touch panel is touched.
Figure 18:
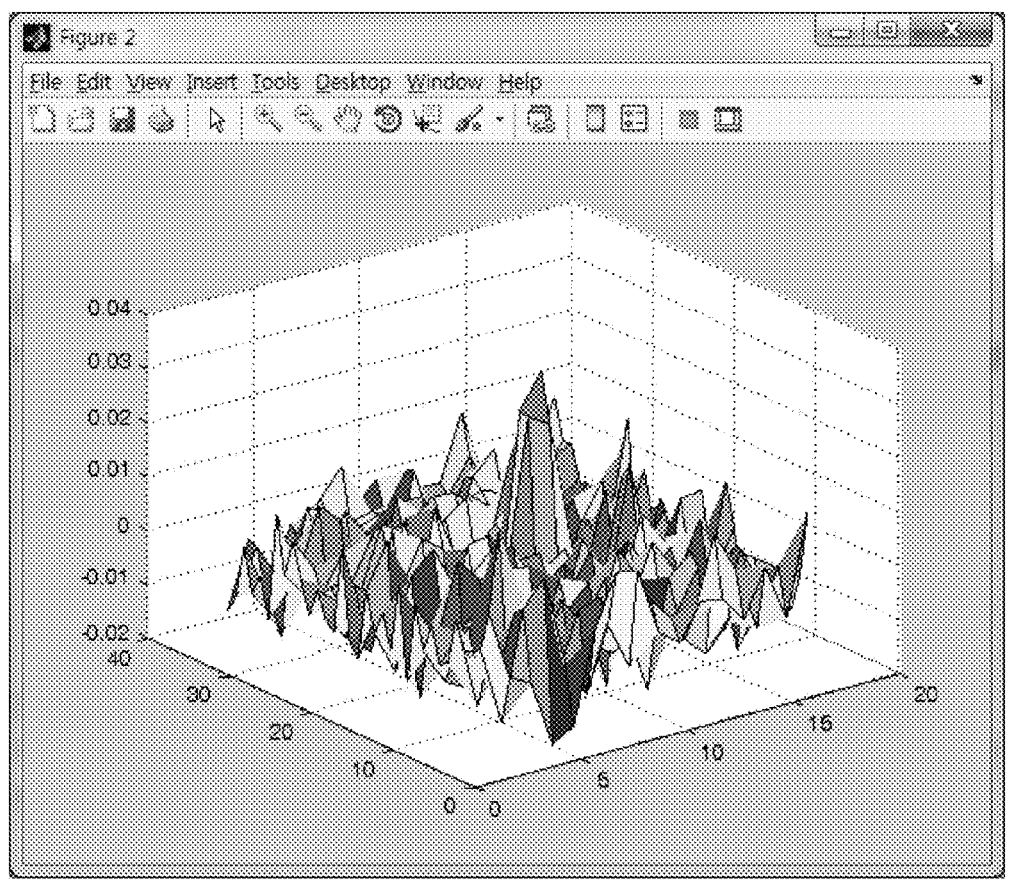
FIG. 18 is a graph illustrating touch signals if driving lines are driven one by one.
Figure 19:
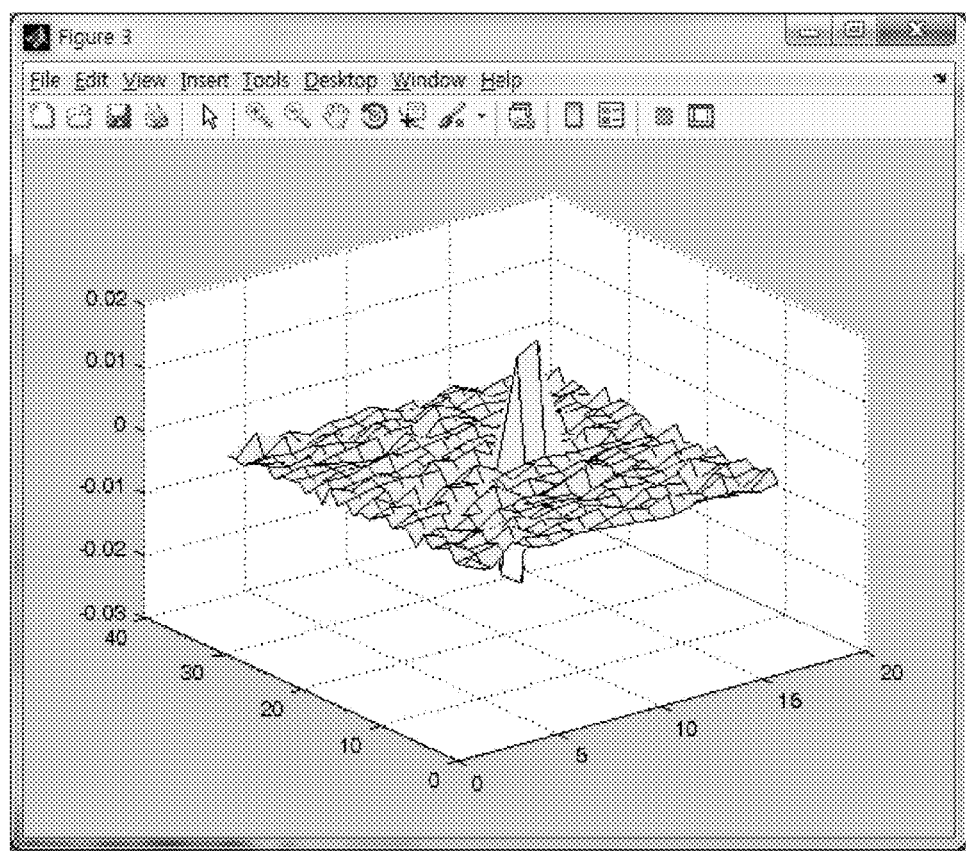
FIG. 19 is a graph illustrating touch signals if 32 driving lines in accordance with one or more embodiments of the present invention are simultaneously driven.

FIG. 17 is a graph illustrating an exemplary touch signals when a portion of a touch panel is touched, FIG. 18 is a graph illustrating exemplary touch signals when driving lines are driven one at a time, and FIG. 19 is a graph illustrating exemplary touch signals when 32 driving lines in accordance with one or more embodiments of the present invention are simultaneously driven.

FIG. 17 illustrates an exemplary touch signal in an environment in which noise is not present, and FIGS. 18 and 19 illustrate touch signals in an environment in which noise is present.

The signal to noise ratio (SNR) in FIG. 19 is greater than the signal to noise ratio (SNR) in FIG. 18. Thus, the present invention may improve touch sensitivity.

As is apparent from the above description, a method of driving a touch panel in accordance with one or more embodiments of the present invention may reduce the dynamic range of signals received by sensing lines and improve a signal-to-noise ratio and sensitivity.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of driving a touch panel having driving lines, sensing lines, and node capacitors between neighboring driving lines and sensing lines, the method comprising:
    pairing neighboring driving lines to form a plurality of pairs such that each of the plurality of pairs is driven using driving signals having an opposite phase;
    shuffling positions of the plurality of pairs so that at least two neighboring pairs include different driving lines;
    classifying or combining at least two shuffled pairs into a first group;
    generating Hadamard codes based on the pairs in each group, including the first group; and
    simultaneously driving the driving lines in each of the generated Hadamard codes.

2. The method according to claim 1, wherein the two neighboring pairs include one common driving line.

3. The method according to claim 1, wherein generating the Hadamard codes includes Hadamard coding the pairs in each group based on the equation:

$$H[x] = \begin{bmatrix} Pa1(+) & Pa1(+) \\ Pa3(+) & Pa3(-) \end{bmatrix},$$

to form primary Hadamard codes, wherein x represents a group having at least two pairs with different driving lines, Pa1 and Pa3 represent the two pairs in the group x, (+) represents driving signals having the same phase as the driving signals in the paired neighboring driving lines, and (−) represents driving signals having an opposite phase to the driving signals in the paired neighboring driving lines.

4. The method according to claim 3, wherein generating the Hadamard codes further includes:
    shuffling the primary Hadamard codes so that at least one set of neighboring primary Hadamard codes includes different driving lines;
    forming a plurality of groups by selecting and classifying or combining two primary Hadamard codes including different driving lines into one group; and
    generating secondary Hadamard codes by Hadamard coding the two primary Hadamard codes in each of the plurality of groups according to the equation:

$$2H[y] = \begin{bmatrix} H[1](+) & H[1](+) \\ H[3](+) & H[3](-) \end{bmatrix},$$

wherein y represents a group having primary Hadamard codes with different driving lines, H[1] and H[3] represent the Hadamard codes in the group y, (+) represents driving signals having the same phase as the driving signals in the paired neighboring driving lines, and (−) represents driving signals having an opposite phase to the driving signals in the paired neighboring driving lines.

5. The method according to claim 4, wherein the number of the simultaneously driven driving lines is a power of 2.

6. A method of driving a touch panel having first to ith driving lines, i being a natural number >1, sensing lines, and node capacitors between neighboring driving lines and sensing lines, in which $2^{k+1}$ driving lines (k being a natural number ≥1) are simultaneously driven, the method comprising:
    pairing neighboring driving lines among first to $i^{th}$ driving lines to form first to $m^{th}$ sequential pairs, m being a natural number >1;
    setting the first to $m^{th}$ pairs such that each of the first to $m^{th}$ pairs is driven using driving signals having an opposite phase;
    shuffling positions of the first to $m^{th}$ pairs so that at least one set of two neighboring pairs includes different driving lines;
    selecting and classifying or combining at least two pairs including different driving lines into a first group;
    generating k-dimensional Hadamard codes by Hadamard coding, based on the at least two pairs in each group; and
    simultaneously driving the driving lines in each of the k-dimensional Hadamard codes.

7. The method according to claim 6, wherein, in forming the first to mth pairs, two neighboring pairs among the first to mth pairs include one common driving line.

8. The method according to claim 6, wherein shuffling the positions of the first to mth pairs comprises selecting two pairs including different driving lines from the first to mth pairs, and changing the positions of the first to mth pairs so that the selected pairs neighbor each other.

9. The method according to claim 6, wherein generating the k-dimensional Hadamard codes includes:
generating primary Hadamard codes by Hadamard coding the pairs in each of the first to $m^{th}$ pairs;
shuffling the primary Hadamard codes so that at least one set of at least two neighboring primary Hadamard codes includes different driving lines;
generating secondary Hadamard codes by Hadamard coding the shuffled primary Hadamard codes; and
generating the k-dimensional Hadamard codes by repeating shuffling and Hadamard coding.

10. The method according to claim 6, wherein generating the k-dimensional Hadamard codes is carried out based on the equation:

$$(k)H[y] = \begin{bmatrix} (k-1)H[1](+) & (k-1)H[1](+) \\ (k-1)H[3](+) & (k-1)H[3](-) \end{bmatrix},$$

wherein k represents a dimension of Hadamard codes, y represents a group including (k−1)-dimensional Hadamard codes having different driving lines, (k−1)H[1] and (k−1)H[3] represent the (k−1)-dimensional Hadamard codes in the group y, [0]H[1] and [0]H[3] represent two pairs including different driving lines after shuffling if k=1, (+) represents driving signals having the same phase as the driving signals in the paired neighboring driving lines in the (k−1)-dimensional Hadamard code, and (−) represents driving signals having an opposite phase to the driving signals in the paired neighboring driving lines in the (k−1)-dimensional Hadamard code.

11. The method according to claim 6, further comprising changing the driving lines in at least one of the pairs in at least one of the k-dimensional Hadamard codes to different driving lines.

12. The method according to claim 11, wherein the driving lines in at least one of the pairs in at least one of the k-dimensional Hadamard codes are changed within the first to ith driving lines.

13. The method according to claim 6, further comprising changing the driving lines in at least one of the pairs in at least one of the k-dimensional Hadamard codes to be in common with at least one of the driving lines in the pair in another one of the k-dimensional Hadamard codes.

14. The method according to claim 6, wherein a driving time of the driving lines in each of the k-dimensional Hadamard codes is at least twice a driving time of the driving lines in each of the (k−1)-dimensional Hadamard codes.

15. The method according to claim 6, further comprising receiving a superposed signal through each of the sensing lines, wherein the superposed signal is a signal resulting from superposition of driving signals received on one of the sensing lines corresponding to the driving lines in each of the simultaneously driven k-dimensional Hadamard codes.

16. A method of driving a touch panel having first to ith driving lines, i being a natural number >1, sensing lines, and node capacitors between neighboring driving lines and sensing lines, in which $2^{k+1}$ driving lines (k being a natural number ≥1) are simultaneously driven, the method comprising:
pairing neighboring driving lines among the first to $i^{th}$ driving lines, and setting the pairs such that each of the pairs is driven using driving signals having an opposite phase;
grouping the pairs and shuffling the pairs so that the pairs in each group include different driving lines;
selecting and classifying or combining at least two pairs in each group into one or more sub-groups;
selecting at least two pairs among the pairs in each sub-group, and generating k-dimensional Hadamard codes by Hadamard coding the selected pairs; and
simultaneously driving the driving lines in each of the k-dimensional Hadamard codes.

17. The method according to claim 16, wherein, in forming the plurality of pairs, a number difference between the two driving lines in each of the plurality of pairs is 1.

18. The method according to claim 16, wherein, in forming the plurality of pairs, a number difference between the two driving lines in at least one of the plurality of pairs is 2 or more.

19. The method according to claim 16, wherein generating the k-dimensional Hadamard codes is carried out based on the equation:

$$(k)H[y] = \begin{bmatrix} (k-1)H[1](+) & (k-1)H[1](+) \\ (k-1)H[3](+) & (k-1)H[3](-) \end{bmatrix},$$

wherein k represents a dimension of the Hadamard codes, y represents a group including (k−1)-dimensional Hadamard codes having different driving lines, (k−1)H[1] and (k−1)H[3] represent the (k−1)-dimensional Hadamard codes in the group y, [0]H[1] and [0]H[3] represent at least two pairs including different driving lines after shuffling when k=1, (+) represents driving signals having the same phase as the driving signals in the paired neighboring driving lines in the (k−1)-dimensional Hadamard code, and (−) represents driving signals having an opposite phase to the driving signals in the paired neighboring driving lines in the (k−1)-dimensional Hadamard code.

20. The method according to claim 16, further comprising changing the driving lines in at least one of the pairs in at least one of the k-dimensional Hadamard codes to different driving lines.

* * * * *